(12) United States Patent
Tseng

(10) Patent No.: US 11,818,702 B2
(45) Date of Patent: Nov. 14, 2023

(54) METHOD AND APPARATUS OF HANDLING SEMI-PERSISTENT SCHEDULING (SPS) DEACTIVATION STATE OF UNICAST AND MULTICAST IN A WIRELESS COMMUNICATION SYSTEM

(71) Applicant: ASUSTek Computer Inc., Taipei (TW)

(72) Inventor: Li-Chih Tseng, Taipei (TW)

(73) Assignee: ASUSTek Computer Inc., Taipei (TW)

(*) Notice: Subject to any disclaimer, the term of this patent is extended or adjusted under 35 U.S.C. 154(b) by 0 days.

(21) Appl. No.: 18/125,175

(22) Filed: Mar. 23, 2023

(65) Prior Publication Data

US 2023/0309082 A1 Sep. 28, 2023

Related U.S. Application Data

(60) Provisional application No. 63/323,664, filed on Mar. 25, 2022.

(51) Int. Cl.
*H04W 74/02* (2009.01)
*H04W 72/12* (2023.01)
*H04W 72/11* (2023.01)

(52) U.S. Cl.
CPC .................. *H04W 72/11* (2023.01)

(58) Field of Classification Search
CPC ... H04W 72/11; H04W 72/12; H04W 72/121; H04W 72/20
See application file for complete search history.

(56) References Cited

U.S. PATENT DOCUMENTS

| 2018/0323909 | A1* | 11/2018 | Ying | H04L 1/1822 |
| 2018/0324889 | A1* | 11/2018 | Babaei | H04L 5/0098 |
| 2018/0368117 | A1* | 12/2018 | Ying | H04L 1/0061 |
| 2019/0053211 | A1* | 2/2019 | Ying | H04W 72/044 |
| 2019/0245657 | A1* | 8/2019 | Lee | H04L 1/1835 |

(Continued)

FOREIGN PATENT DOCUMENTS

| WO | WO-2018016135 A1 * | 1/2018 | ........... H04B 7/0452 |
| WO | WO-2021033116 A1 * | 2/2021 | ........... H04L 1/1854 |

(Continued)

OTHER PUBLICATIONS

3GPP TSG RAN WG1 Meeting#105-E, R1-2106378 (Year: 2021).*
3GPP TSG-RAN WG2 Meeting#101, R2-1803704 (Year: 2018).*
TSG-RAN WG@ Meeting#61bis, Tdoc R2-811459 (Year: 2008).*

*Primary Examiner* — Faruk Hamza
*Assistant Examiner* — Abusayeed M Haque
(74) *Attorney, Agent, or Firm* — Cooper Legal Group LLC

(57) ABSTRACT

A method and apparatus are disclosed. In an example from the perspective of a base station operating with Semi-Persistent Scheduling (SPS) for unicast and multicast, the base station configures a User Equipment (UE) with a unicast SPS operation configuration using a first information element including a sps-Config information element or a sps-ConfigToAddModList information element. The base station determines, based upon whether the first information element includes the sps-Config information element or the sps-ConfigToAddModList information element, whether or not to configure the UE with a multicast SPS operation configuration using a sps-ConfigMulticastToAddModList information element.

15 Claims, 14 Drawing Sheets

(56) References Cited

U.S. PATENT DOCUMENTS

| | | | |
|---|---|---|---|
| 2020/0044792 A1* | 2/2020 | Vaidya | H04L 47/34 |
| 2021/0227620 A1* | 7/2021 | Pan | H04W 4/40 |
| 2022/0124766 A1* | 4/2022 | Jung | H04W 72/1273 |
| 2023/0140745 A1* | 5/2023 | Da Silva | H04W 36/0016 370/331 |

FOREIGN PATENT DOCUMENTS

| | | | |
|---|---|---|---|
| WO | WO-2022028521 A1 * | 2/2022 | H04W 72/11 |
| WO | WO-2022202959 A1 * | 9/2022 | H04W 84/06 |

* cited by examiner

| SPS ID | UE A | UE B | UE C | UE D | UE E |
|---|---|---|---|---|---|
| Unicast | 0 1 | | 2 3 | | |
| Multicast | 3 4 | 3 4 | 4 5 | 4 | 0 |
| Deactivation State | ③→3 ①→0 1 | | ①→2 3 ②→2 ③→3 ④→4 ⑤→5 ⑥→2 3 5 | | |

State entry  
SPS ID

— 500

| Shared List | Deactivation State List | |
|---|---|---|
| | One List | Two Lists |
| CS-RNTI | System A | List 1 |
| G-CS-RNTI (may be more than one) | • Applied for all G-CS-RNTI<br>• Not Applied for all G-CS-RNTI<br>• Configurable for all G-CS-RNTI<br>• Configurable for each G-CS-RNTI | List 2<br><br>• Applied for all G-CS-RNTI<br>• Configurable for each G-CS-RNTI |

CONFIGURE UE WITH MULTICAST SPS OPERATION CONFIGURATION USING SPS-CONFIGMULTICASTTOADDMODLIST INFORMATION ELEMENT, WHEREIN BASE STATION IS NOT ALLOWED TO CONFIGURE UE WITH UNICAST SPS OPERATION CONFIGURATION USING SPS-CONFIG INFORMATION ELEMENT, AND BASE STATION IS ALLOWED TO CONFIGURE UE WITH UNICAST SPS OPERATION CONFIGURATION USING SPS-CONFIGTOADDMODLIST INFORMATION ELEMENT ⟵ 1205

FIG. 12

METHOD AND APPARATUS OF HANDLING SEMI-PERSISTENT SCHEDULING (SPS) DEACTIVATION STATE OF UNICAST AND MULTICAST IN A WIRELESS COMMUNICATION SYSTEM

CROSS-REFERENCE TO RELATED APPLICATION

The present Application claims the benefit of U.S. Provisional Patent Application Ser. No. 63/323,664 filed on Mar. 25, 2022, the entire disclosure of which is incorporated herein in its entirety by reference.

FIELD

This disclosure generally relates to wireless communication networks, and more particularly, to a method and apparatus of handling semi-persistent scheduling (SPS) deactivation state of unicast and multicast in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a base station operating with Semi-Persistent Scheduling (SPS) for unicast and multicast, the base station configures a User Equipment (UE) with a unicast SPS operation configuration using a first information element comprising a sps-Config information element or a sps-ConfigToAddModList information element. The base station determines, based upon whether the first information element comprises the sps-Config information element or the sps-ConfigToAddModList information element, whether or not to configure the UE with a multicast SPS operation configuration using a sps-ConfigMulticastToAddModList information element.

In an example from the perspective of a base station operating with SPS for unicast and multicast, the base station configures a UE with a multicast SPS operation configuration using a sps-ConfigMulticastToAddModList information element. The base station is not allowed to configure the UE with a unicast SPS operation configuration using a sps-Config information element. The base station is allowed to configure the UE with a unicast SPS operation configuration using a sps-ConfigToAddModList information element.

In an example from the perspective of a UE operating with SPS for unicast and multicast, the UE receives a first information element comprising a sps-Config information element or a sps-ConfigToAddModList information element. The UE configures a unicast SPS operation configuration based upon the first information element. Based upon the first information element comprising the sps-Config information element, the UE does not monitor for reception of a sps-ConfigMulticastToAddModList information element associated with configuring a multicast SPS operation configuration for the UE. Alternatively and/or additionally, based upon the first information element comprising the sps-ConfigToAddModList information element, the UE monitors for reception of a sps-ConfigMulticastToAddModList information element associated with configuring a multicast SPS operation configuration for the UE.

In an example from the perspective of a UE operating with SPS for unicast and multicast, the UE receives a sps-ConfigMulticastToAddModList information element. The UE configures a multicast SPS operation configuration based upon the sps-ConfigMulticastToAddModList information element. The UE does not monitor for reception of a sps-Config information element associated with configuring a unicast SPS operation configuration. The UE monitors for reception of a sps-ConfigToAddModList information element associated with configuring a unicast SPS operation configuration.

BRIEF DESCRIPTION OF THE DRAWINGS

FIG. 5 is a diagram illustrating one or more exemplary scenarios associated with semi-persistent scheduling (SPS) configuration of one or more UEs according to one exemplary embodiment.

FIG. 12 is a flow chart according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based upon code division multiple access (CDMA), time division multiple access (TDMA), orthogonal frequency division multiple access (OFDMA), 3rd Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: R1-2202951 Corrections on the introduction of multicast-broadcast services in NR; R1-2202968 Corrections on NR Multicast and Broadcast Services in 38.212; R2-2203818 Introduction of NR MBS; R2-2204251 Introduction of NR MBS into 38.331; R2-2204261 Introduction of NR MBS; RP-220407 Status report for WI NR Multicast and Broadcast Services. The standards and documents listed above are hereby expressly incorporated by reference in their entirety.

Figure 1:
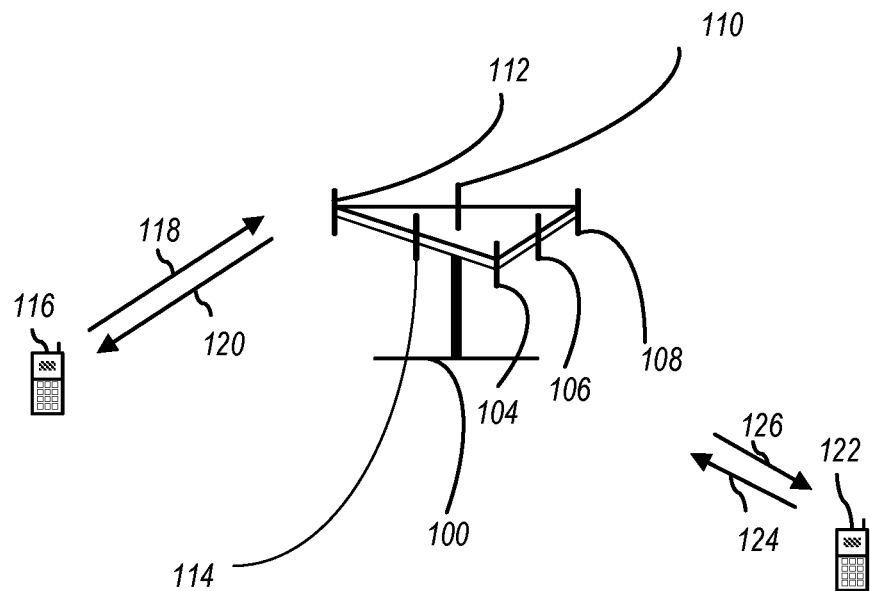
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
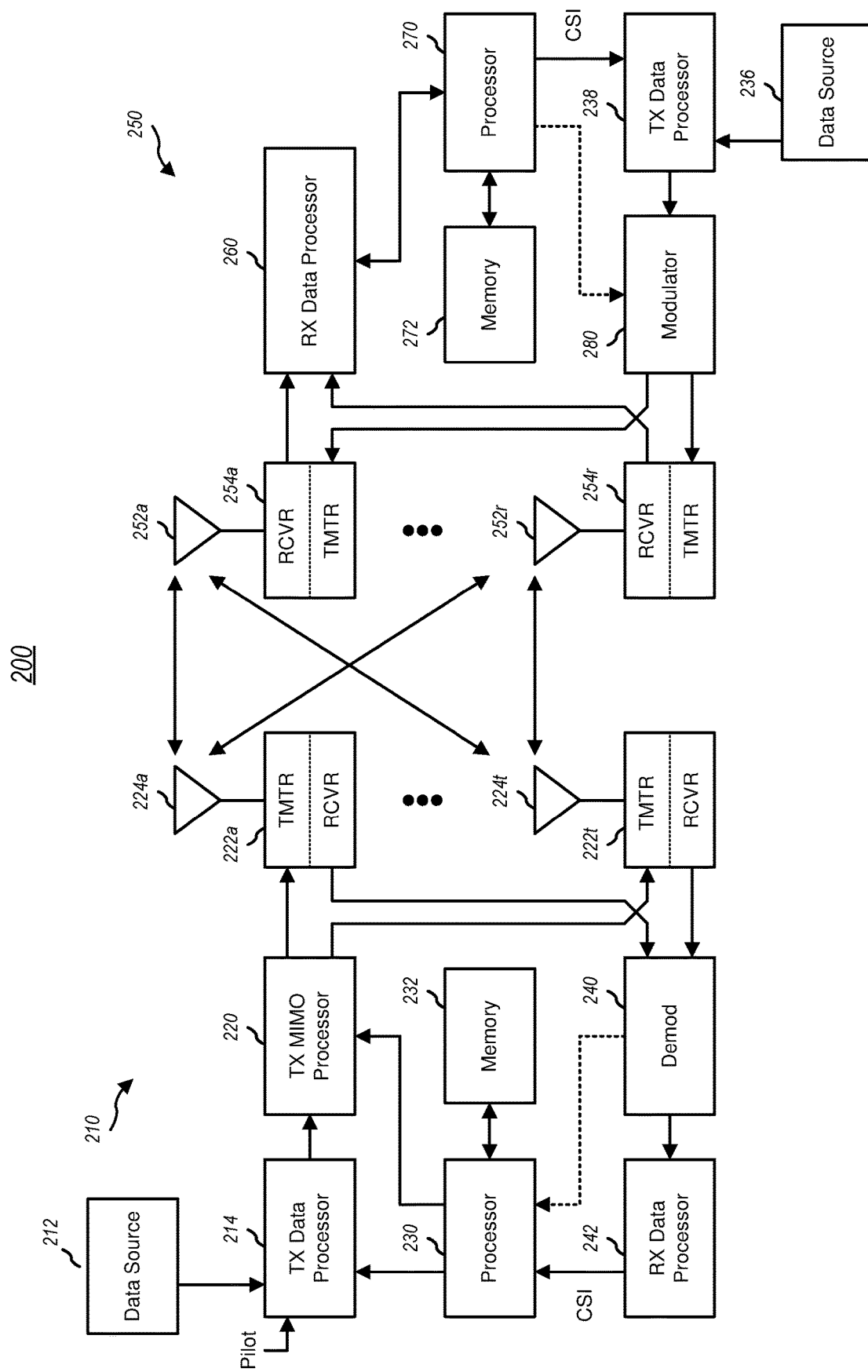
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based upon a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based upon a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides NT modulation symbol streams to NT transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. NT modulated signals from transmitters 222a through 222t may then be transmitted from NT antennas 224a through 224t, respectively.

At receiver system 250, the transmitted modulated signals are received by NR antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the NR received symbol streams from NR receivers 254 based upon a particular receiver processing technique to provide NT "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
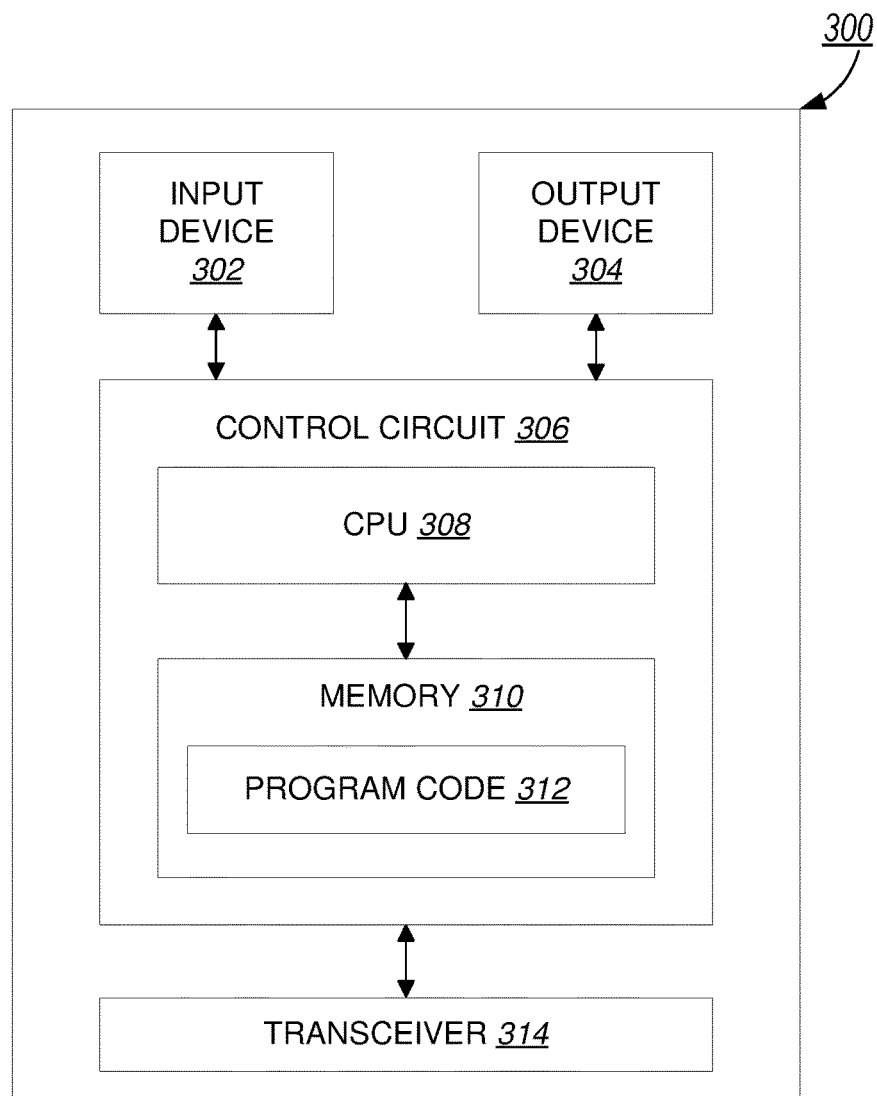
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
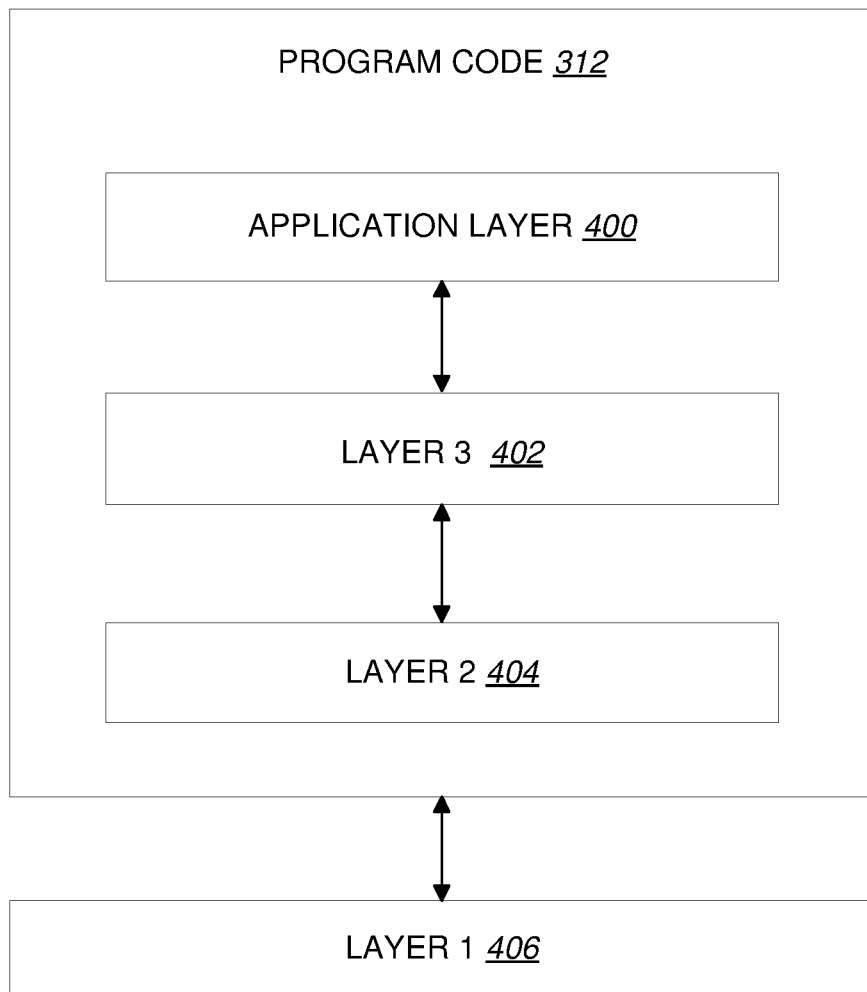
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

One or more parts of R1-2202951 (TS 38.213) are quoted below:
Summary of Change:
10. Include SPS GC-PDSCH activation/deactivation by DCI formats 4_1/4_2 in clause 10.2.
10.2 PDCCH Validation for DL SPS and UL Grant Type 2
A UE validates, for scheduling activation or scheduling release, a DL SPS assignment PDCCH or a configured UL grant Type 2 PDCCH if
    the CRC of a corresponding DCI format is scrambled with a CS-RNTI provided by cs-RNTI or a G-CS-RNTI provided by g-cs-RNTI, and
    the new data indicator field in the DCI format for the enabled transport block is set to '0', and
    the DFI flag field, if present, in the DCI format is set to '0', and
    if validation is for scheduling activation and if the PDSCH-to-HARQ_feedback timing indicator field in the DCI format is present, the PDSCH-to-HARQ_feedback timing indicator field does not provide an inapplicable value from dl-DataToUL-ACK-r16.

If a UE is provided a single configuration for UL grant Type 2 PUSCH or for SPS PDSCH, validation of the DCI format is achieved if all fields for the DCI format are set according to Table 10.2-1 or Table 10.2-2.

If a UE is provided more than one configuration for UL grant Type 2 PUSCH or for SPS PDSCH, a value of the HARQ process number field in a DCI format indicates an activation for a corresponding UL grant Type 2 PUSCH or for a SPS PDSCH configuration with a same value as provided by ConfiguredGrantConfigIndex or by sps-ConfigIndex, respectively. Validation of the DCI format is achieved if the RV field for the DCI format is set as in Table 10.2-3.

If a UE is provided more than one configuration for UL grant Type 2 PUSCH or for SPS PDSCH
    if the UE is provided ConfiguredGrantConfigType2DeactivationStateList or sps-ConfigDeactivationStateList, a value of the HARQ process number field in a DCI format indicates a corresponding entry for scheduling release of one or more UL grant Type 2 PUSCH or SPS PDSCH configurations
    if the UE is not provided ConfiguredGrantConfigType2DeactivationStateList or sps-ConfigDeactivationStateList, a value of the HARQ process number field in a DCI format indicates a release for a corresponding UL grant Type 2 PUSCH or for a SPS PDSCH configuration with a same value as provided by ConfiguredGrantConfigIndex or by sps-ConfigIndex, respectively Validation of the DCI format is achieved if all fields for the DCI format are set according to Table 10.2-4. If validation is achieved, the UE considers the information in the DCI format as a valid activation or valid release of DL SPS or configured UL grant Type 2. If validation is not achieved, the UE discards all the information in the DCI format.

TABLE 10.2-1

Special fields for single DL SPS or single UL grant Type 2 scheduling activation PDCCH validation when a UE is provided a single SPS PDSCH or UL grant Type 2 configuration in the active DL/UL BWP of the scheduled cell

|  | DCI format 0_0/0_1/0_2 | DCI format 1_0/1_2/4_1 | DCI format 1_1/4_2 |
| --- | --- | --- | --- |
| HARQ process number | set to all '0's | set to all '0's | set to all '0's |
| Redundancy version | set to all '0's | set to all '0's | For the enabled transport block: set to all '0's |

TABLE 10.2-2

Special fields for single DL SPS or single UL grant Type 2 scheduling release PDCCH validation when a UE is provided a single SPS PDSCH or UL grant Type 2 configuration in the active DL/UL BWP of the scheduled cell

|  | DCI format 0_0/0_1/0_2 | DCI format 1_0/1_1/1_2/4_1/4_2 |
| --- | --- | --- |
| HARQ process number | set to all '0's | set to all '0's |
| Redundancy version | set to all '0's | set to all '0's |
| Modulation and coding scheme | set to all '1's | set to all '1's |

TABLE 10.2-2-continued

Special fields for single DL SPS or single UL grant Type 2
scheduling release PDCCH validation when a UE is
provided a single SPS PDSCH or UL grant Type 2
configuration in the active DL/UL BWP of the scheduled cell

| | DCI format 0_0/0_1/0_2 | DCI format 1_0/1_1/1_2/4_1/4_2 |
|---|---|---|
| Frequency domain resource assignment | set to all '0's for FDRA Type 2 with $\mu = 1$ set to all '1's, otherwise | set to all '0's for FDRA Type 0 or for dynamicSwitch set to all '1's for FDRA Type 1 |

TABLE 10.2-3

Special fields for a single DL SPS or single UL grant Type 2
scheduling activation PDCCH validation when a UE is
provided multiple DL SPS or UL grant Type 2
configurations in the active DL/UL BWP of the scheduled cell

| | DCI format 0_0/0_1/0_2 | DCI format 1_0/1_2/4_1 | DCI format 1_1/4_2 |
|---|---|---|---|
| Redundancy version | set to all '0's | set to all '0's | For the enabled transport block: set to all '0's |

TABLE 10.2-4

Special fields for a single or multiple DL SPS and UL grant Type 2
scheduling release PDCCH validation when a UE is
provided multiple DL SPS or UL grant Type 2
configurations in the active DL/UL BWP of the scheduled cell

| | DCI format 0_0/0_1/0_2 | DCI format 1_0/1_1/1_2/4_1/4_2 |
|---|---|---|
| Redundancy version | set to all '0's | set to all '0's |
| Modulation and coding scheme | set to all '1's | set to all '1's |
| Frequency domain resource assignment | set to all '0's for FDRA Type 2 with $\mu = 1$ set to all '1's, otherwise | set to all '0's for FDRA Type 0 or for dynamicSwitch set to all '1's for FDRA Type 1 |

A UE is expected to provide HARQ-ACK information in response to a SPS PDSCH release after N symbols from the last symbol of a PDCCH providing the SPS PDSCH release. If processingType2Enabled of PDSCH-ServingCellConfig is set to enable for the serving cell with the PDCCH providing the SPS PDSCH release, N=5 for $\mu=0$, N=5.5 for $\mu=1$, and N=11 for $\mu=2$, otherwise, N=10 for $\mu=0$, N=12 for $\mu=1$, N=22 for $\mu=2$, N=25 for $\mu=3$, N=100 for $\mu=5$, and N=200 for $\mu=6$, wherein $\mu$ corresponds to the smallest SCS configuration between the SCS configuration of the PDCCH providing the SPS PDSCH release and the SCS configuration of a PUCCH carrying the HARQ-ACK information in response to a SPS PDSCH release.

One or more parts of R1-2202968 (TS 38.212) are quoted below:

7.3.1.5.2 Format 4_1

DCI format 4_1 is used for the scheduling of PDSCH for multicast in DL cell.

The following information is transmitted by means of the DCI format 4_1 with CRC scrambled by G-RNTI configured by G-RNTI-Config or G-CS-RNTI:

7.3.1.5.3 Format 4_2

DCI format 4_2 is used for the scheduling of PDSCH in DL cell.

The following information is transmitted by means of the DCI format 4_2 with CRC scrambled by G-RNTI configured by G-RNTI-Config or G-CS-RNTI:

One or more parts of R2-2203818 (TS 38.321 Medium Access Control (MAC)) are quoted below:

5.3 DL-SCH Data Transfer 5.3.1 DL Assignment Reception

Downlink assignments received on the PDCCH both indicate that there is a transmission on a DL-SCH for a particular MAC entity and provide the relevant HARQ information.

When the MAC entity has a C-RNTI, Temporary C-RNTI, or CS-RNTI, the MAC entity shall for each PDCCH occasion during which it monitors PDCCH and for each Serving Cell:

1> if a downlink assignment for this PDCCH occasion and this Serving Cell has been received on the PDCCH for the MAC entity's C-RNTI, or Temporary C-RNTI, or G-RNTI:
  2> if this is the first downlink assignment for this Temporary C-RNTI:
    3> consider the NDI to have been toggled.
  2> if the downlink assignment is for the MAC entity's C-RNTI, and if the previous downlink assignment indicated to the HARQ entity of the same HARQ process was either a downlink assignment received for the MAC entity's CS-RNTI or G-CS-RNTI, or a configured downlink assignment for unicast or MBS multicast; or
  2> if the downlink assignment is for the MAC entity's G-RNTI, and if the previous downlink assignment indicated to the HARQ entity of the same HARQ process was either a downlink assignment received for the MAC entity's CS-RNTI or G-CS-RNTI, or other G-RNTI, or C-RNTI, or a configured downlink assignment for unicast or MBS multicast:
    3> consider the NDI to have been toggled regardless of the value of the NDI.
  2> indicate the presence of a downlink assignment and deliver the associated HARQ information to the HARQ entity.
1> else if a downlink assignment for this PDCCH occasion has been received for this Serving Cell on the PDCCH for the MAC entity's CS-RNTI or G-CS-RNTI:
  2> if the NDI in the received HARQ information is 1:
    3> consider the NDI for the corresponding HARQ process not to have been toggled;
    3> indicate the presence of a downlink assignment for this Serving Cell and deliver the associated HARQ information to the HARQ entity.
  2> if the NDI in the received HARQ information is 0:
    3> if PDCCH contents indicate SPS deactivation:
      4> clear the configured downlink assignment for this Serving Cell (if any);
      4> if the timeAlignmentTimer, associated with the TAG containing the Serving Cell on which the HARQ feedback is to be transmitted, is running:
  5> indicate a positive acknowledgement for the SPS deactivation to the physical layer.
3> else if PDCCH content indicates SPS activation:
  4> store the downlink assignment for this Serving Cell and the associated HARQ information as configured downlink assignment;
  4> initialise or re-initialise the configured downlink assignment for this Serving Cell to start in the associated PDSCH duration and to recur according to rules in clause 5.8.1;

For each Serving Cell and each configured downlink assignment, if configured and activated, the MAC entity shall:
  1> if the PDSCH duration of the configured downlink assignment does not overlap with the PDSCH duration of a downlink assignment received on the PDCCH for this Serving Cell:
    2> instruct the physical layer to receive, in this PDSCH duration, transport block on the DL-SCH according to the configured downlink assignment and to deliver it to the HARQ entity;
    2> set the HARQ Process ID to the HARQ Process ID associated with this PDSCH duration;
    2> consider the NDI bit for the corresponding HARQ process to have been toggled;
    2> indicate the presence of a configured downlink assignment and deliver the stored HARQ information to the HARQ entity.

One or more parts of R2-2204251 (TS 38.331 Radio Resource Control (RRC)) are quoted below:

BWP-DownlinkDedicated

The IE BWP-DownlinkDedicated is used to configure the dedicated (UE specific) parameters of a downlink BWP.

BWP-DownlinkDedicated information element

```
-- ASN1START
-- TAG-BWP-DOWNLINKDEDICATED-START
BWP-DownlinkDedicated ::=            SEQUENCE {
    pdcch-Config                         SetupRelease { PDCCH-Config }        OPTIONAL,   -- Need M
    pdsch-Config                         SetupRelease { PDSCH-Config }        OPTIONAL,   -- Need M
    sps-Config                           SetupRelease { SPS-Config }          OPTIONAL,   -- Need M
    radioLinkMonitoringConfig            SetupRelease { RadioLinkMonitoringConfig }                                         OPTIONAL,   -- Need M
    ...,
    [[
    sps-ConfigToAddModList-r16           SPS-ConfigToAddModList-r16           OPTIONAL,   -- Need N
    sps-ConfigToReleaseList-r16          SPS-ConfigToReleaseList-r16          OPTIONAL,   -- Need N
    sps-ConfigDeactivationStateList-r16  SPS-ConfigDeactivationStateList-r16  OPTIONAL,   -- Need R
    beamFailureRecoverySCellConfig-r16   SetupRelease {BeamFailureRecoverySCellConfig-r16}                                  OPTIONAL,   -- Cond SCellOnly
    sl-PDCCH-Config-r16                  SetupRelease { PDCCH-Config }        OPTIONAL,   -- Need M
    sl-V2X-PDCCH-Config-r16              SetupRelease { PDCCH-Config }        OPTIONAL    -- Need M
    ]],
    [[
    cfr-ConfigMulticast-r17              SetupRelease { CFR-ConfigMulticast-r17 }                                           OPTIONAL    -- Need M
    ]]
}
SPS-ConfigToAddModList-r16 ::=           SEQUENCE (SIZE (1..maxNrofSPS-Config-r16)) OF SPS-Config
SPS-ConfigToReleaseList-r16 ::=          SEQUENCE (SIZE (1..maxNrofSPS-Config-r16)) OF SPS-ConfigIndex-r16
SPS-ConfigDeactivationState-r16 ::=      SEQUENCE (SIZE (1..maxNrofSPS-Config-r16)) OF SPS-ConfigIndex-r16
SPS-ConfigDeactivationStateList-r16 ::=  SEQUENCE (SIZE (1..maxNrofSPS-DeactivationState)) OF SPS-ConfigDeactivationState-r16
-- TAG-BWP-DOWNLINKDEDICATED-STOP
-- ASN1STOP
```

| BWP-DownlinkDedicated field descriptions |
| --- |
| beamFailureRecoverySCellConfig |
| Configuration of candidate RS for beam failure recovery in SCells. |
| cfr-ConfigMulticast |
| UE specific common frequency resource configuration for MBS multicast for one dedicated BWP. This field can be configured within at most one serving cell. |
| pdcch-Config |
| UE specific PDCCH configuration for one BWP. |
| pdsch-Config |
| UE specific PDSCH configuration for one BWP. |
| sps-Config |
| UE specific SPS (Semi-Persistent Scheduling) configuration for one BWP. Except for reconfiguration with sync, the NW does not reconfigure sps-Config when there is an active configured downlink assignment (see TS 38.321 [3]). However, the NW may release the sps-Config at any time. Network can only configure SPS in one BWP using either this field or sps-ConfigToAddModList. |
| sps-ConfigDeactivationStateList |
| Indicates a list of the deactivation states in which each state can be mapped to a single or multiple SPS configurations to be deactivated, see clause 10.2 in TS 38.213 [13]. If a state is mapped to multiple SPS configurations, each of these SPS configurations is configured with the same harq-CodebookID. |
| sps-ConfigToAddModList |
| Indicates a list of one or more DL SPS configurations to be added or modified in one BWP. Except for reconfiguration with sync, the NW does not reconfigure a SPS configuration when it is active (see TS 38.321 [3]). |
| sps-ConfigToReleaseList |
| Indicates a list of one or more DL SPS configurations to be released. The NW may release a SPS configuration at any time. |
| radioLinkMonitoringConfig |
| UE specific configuration of radio link monitoring for detecting cell- and beam radio link failure occasions. The maximum number of failure detection resources should be limited up to 8 for both cell and beam radio link failure detection. For SCells, only periodic 1-port CSI-RS can be configured in IE RadioLinkMonitoringConfig. |
| sl-PDCCH-Config |
| Indicates the UE specific PDCCH configurations for receiving the SL grants (via SL-RNTI or SL-CS-RNTI) for NR sidelink communication. |
| sl-V2X-PDCCH-Config |
| Indicates the UE specific PDCCH configurations for receiving SL grants (i.e. sidelink SPS) for V2X sidelink communication. |

| Conditional Presence | Explanation |
| --- | --- |
| ScellOnly | The field is optionally present, Need M, in the BWP-DownlindDedicated of an Scell. It is absent otherwise. |

CFR-ConfigMulticast
The IE CFR-ConfigMulticast indicates UE specific common frequency resource configuration for multicast for one dedicated BWP.

| CFR-ConfigMulticast information element |
| --- |

```
-- ASN1START
-- TAG-CFRCONFIGMULTICAST-START
CFR-ConfigMulticast-r17::=SEQUENCE {
  locationAndBandwidthMulticast-r17           INTEGER (0..37949)
OPTIONAL,   -- Need S
  pdcch-ConfigMulticast-r17                   PDCCH-Config
OPTIONAL,   -- Need M
  pdsch-ConfigMulticast-r17                   PDSCH-Config
OPTIONAL,   -- Need M
    sps-ConfigMulticastToAddModList-r17           SPS-
ConfigMulticastToAddModList-r17    OPTIONAL,    -- Need N
    sps-ConfigMulticastToReleaseList-r17          SPS-
```

| CFR-ConfigMulticast information element |  |
| --- | --- |
| ConfigMulticastToReleaseList-r17 } | OPTIONAL  -- Need N |
| SPS-ConfigMulticastToAddModList-r17 Config | ::= SEQUENCE (SIZE (1..8)) OF SPS- |
| SPS-ConfigMulticastToReleaseList-r17 SPS-ConfigIndex-r16 -- TAG-CFRCONFIGMULTICAST-STOP -- ASN1STOP | ::= SEQUENCE (SIZE (1..8)) OF |

| CFR-ConfigMulticast field descriptions |
| --- |
| locationAndBandwidthMulticast |
| Frequency domain location and bandwidth for MBS multicast. The value of the field shall be interpreted as resource indicator value (RIV) as defined TS 38.214 [19] with assumptions as described in TS 38.213 [13], clause 12, i.e. setting N˜size_BWP=275. The first PRB is a PRB determined by subcarrierSpacing of the associated BWP and offsetToCarrier corresponding to this subcarrier spacing. If not configured, the UE applies the value of locationAndBandwidth of the DL BWP in which the cfr-ConfigMulticast is configured. pdcch-ConfigMulticast |
| UE specific group-common PDCCH configuration for MBS multicast for one CFR. pdsch-ConfigMulticast |
| UE specific group-common PDSCH configuration for MBS multicast for one CFR. sps-ConfigMulticastToAddModList |
| Indicates a list of one or more DL SPS configurations for MBS multicast. sps-ConfigMulticastToReleaseList |
| Indicates a list of one or more DL SPS configurations to be released. The NW may release a SPS configuration at any time. |

One or more parts of R2-2204261 (TS 38.300 Stage 2) are quoted below:
3.1 Abbreviations
For the purposes of the present document, the abbreviations given in TR 21.905 [1], in TS 36.300 [2] and the following apply. An abbreviation defined in the present document takes precedence over the definition of the same abbreviation, if any, in TR 21.905 [1] and TS 36.300 [2].
    G-RNTI Group RNTI
    G-CS-RNTI Group Configured Scheduling RNTI
    MRB MBS Radio Bearer
    MT Mobile Termination
    MTCH MBS Traffic Channel
    PTM Point to Multipoint
    PTP Point to Point
8.1 UE Identities
In this clause, the identities used by NR connected to 5GC are listed. For scheduling at cell level, the following identities are used:
    C-RNTI: unique UE identification used as an identifier of the RRC Connection and for scheduling;
    CS-RNTI: unique UE identification used for Semi-Persistent Scheduling in the downlink or configured grant in the uplink;
    INT-RNTI: identification of pre-emption in the downlink;
    MCS-C-RNTI: unique UE identification used for indicating an alternative MCS table for PDSCH and PUSCH;
    P-RNTI: identification of Paging and System Information change notification in the downlink;
    SI-RNTI: identification of Broadcast and System Information in the downlink;
    SP-CSI-RNTI: unique UE identification used for semi-persistent CSI reporting on PUSCH.
For MBS, the following identities are used:
    G-RNTI: Identifies dynamically scheduled transmissions of MTCH(s);
    G-CS-RNTI: Identifies configured scheduled transmissions of MTCH(s);
    MCCH-RNTI: Identifies transmissions of MCCH and MCCH change notification.
16.x Multicast and Broadcast Services
16.x.1 General
NR system enables resource efficient delivery of multicast/broadcast services (MBS).
For broadcast communication service, the same service and the same specific content data are provided simultaneously to all UEs in a geographical area (i.e., all UEs in the broadcast service area are authorized to receive the data). A broadcast communication service is delivered to the UEs using a broadcast session. A UE can receive a broadcast communication service in RRC_IDLE, RRC_INACTIVE and RRC_CONNECTED state.
    For multicast communication service, the same service and the same specific content data are provided simultaneously to a dedicated set of UEs (i.e., not all UEs in the multicast service area are authorized to receive the data). A multicast communication service is delivered to the UEs using a multicast session. A UE can receive a multicast communication service in RRC_CONNECTED state with mechanisms such as PTP and/or PTM delivery, as defined in section 16.x.5.4. HARQ feedback/retransmission can be applied to both PTP and PTM transmission.

16.x.4 Group Scheduling

The following logical channels are used for MBS delivery:
- MTCH: A point-to-multipoint downlink channel for transmitting MBS data of either multicast session or broadcast session from the network to the UE;
- DTCH: A point-to-point channel defined in section 6.2.2 for transmitting MBS data of a multicast session from the network to the UE;
- MCCH: A point-to-multipoint downlink channel used for transmitting MBS broadcast control information associated to one or several MTCH(s) from the network to the UE.

The following connections between logical channels and transport channels for group transmission exist:
- MCCH can be mapped to DL-SCH;
- MTCH can be mapped to DL-SCH.

The following depicts the usage of RNTI for group transmission:
- A UE can receive different services using same or different G-RNTIs/G-CS-RNTIs.

16.x.5.4 Reception of MBS Multicast Data

For multicast service, gNB may deliver Multicast MBS data packets using the following methods:
- PTP Transmission: gNB individually delivers separate copies of MBS data packets to each UEs independently, i.e. gNB uses UE-specific PDCCH with CRC scrambled by UE-specific RNTI (e.g., C-RNTI) to schedule UE-specific PDSCH which is scrambled with the same UE-specific RNTI.
- PTM Transmission: gNB delivers a single copy of MBS data packets to a set of UEs, e.g., gNB uses group-common PDCCH with CRC scrambled by group-common RNTI to schedule group-common PDSCH which is scrambled with the same group-common RNTI.

If a UE is configured with both PTM and PTP transmissions, a gNB dynamically decides whether to deliver multicast data by PTM leg and/or PTP leg for a given UE based on the protocol stack defined in section16.x.3, based on information such as MBS Session QoS requirements, number of joined UEs, UE individual feedback on reception quality, and other criteria. The same QoS requirements apply regardless of the decision.

16.x.5.5 Support of CA

UE can receive MBS multicast data either from a PCell or a single SCell at a time.

16.x.5.6 DRX

The following DRX configuration for PTM/PTP transmission are possible:
- For PTM transmission, a multicast DRX pattern is configured on a per G-RNTI/G-CS-RNTI basis which is independent of UE-specific DRX for unicast transmission;
- For PTP transmission, the UE-specific DRX pattern for unicast is reused, i.e. the UE specific DRX pattern is used for both unicast services and the PTP transmission of MBS. For PTP transmission for PTM retransmission, the UE monitors PDCCH scrambled by C-RNTI/CS-RNTI only during unicast DRX's Active time.

One or more parts of RP-220407 are quoted below:

2.1 RAN1
2.1.1 Agreements
RAN1 #107b-e
Mechanisms to support group scheduling for RRC_CONNECTED UEs
Agreement
DCI format 4_2 doesn't include the following fields:
  Scell dormancy indication
  BWP indicator
DCI format 4_2 includes the following field (configurable):
  MCS/NDI/RV for TB2
    Support of this field is subject to UE capability
RAN1 #108-e
Mechanisms to support group scheduling for RRC_CONNECTED UEs
Agreement
In the reply LS on MBS SPS to RAN2, capture the following for Q1:
  RAN1 confirms that RAN2's understanding is correct.
  RAN1 thinks that the maximum number of G-CS-RNTI configured for UE should be subject to UE capability.
Agreement
In the reply LS on MBS SPS to RAN2, capture the following for Q2:
  From RAN1 perspective, retransmission scheme (i.e. via PTM or PTP) can be changed per TB per transmission.
    UE is not expected to receive PTM retransmission after PTP retransmission for the same multicast TB
    There is no consensus in RAN1 to support PTM retransmission and PTP retransmission simultaneously for different UEs in the same MBS group
  A single CS-RNTI is used for PTP retransmissions of all G-CS-RNTIs.
Agreement
RAN1 thinks that multiple G-CS-RNTIs cannot be mapped to same MBS SPS-config at the same time for a UE.
Reply LS to R1-2200888 on MBS SPS is endorsed in R1-2202591.

2.2 RAN2
2.2.1 Agreements
RAN2 #116bis-e:
Agreements on MAC open issues
- If the downlink assignment is for C-RNTI, and if the previous downlink assignment indicated to the HARQ entity of the same HARQ process was either a downlink assignment received for the MAC entity's G-CS-RNTI or a configured downlink assignment for MBS, or if the downlink assignment is for G-RNTI, and if the previous downlink assignment indicated to the HARQ entity of the same HARQ process was either a downlink assignment received for the MAC entity's G-CS-RNTI or other G-RNTI or C-RNTI or a configured downlink assignment for MBS or unicast,
- Consider the NDI to have been toggled regardless of the value of the NDI.
- One-to-many mapping between G-CS-RNTI and MBS sessions is supported and it is assumed that this does not introduce additional specification work.
- Capture CS-RNTI usage in table for MBS in section 7.1 in MBS MAC running CR, i.e. for PTP for PTM retransmission via CS-RNTI and MBS SPS deactivation via CS-RNTI when MBS SPS is configured.
- If MBS SPS is configured and CS-RNTI is not configured, the retransmission of SPS via PTP is not supported and MBS SPS deactivation via CS-RNTI is not supported.
- The sps-ConfigIndex should unique in UE no matter the SPS is for unicast or multicast.
- RAN2 assume no RAN2 spec impact when more than one NACK-only based feedback are available for transmission in the same PUCCH slot and UE will transform NACK-only into ACK/NACK HARQ bits.
- Remove the editor note about active time for MBS DRX
- In PTP for PTM retransmission, the UE monitors UE specific PDCCH/C-RNTI only during unicast DRX's active time. Unicast DRX's RTT timer can be started when PTP retransmission is expected.

RAN2 confirm RAN1 agreement "the multicast MBS reception will impact BWP switching inactivity timer, but the broadcast MBS reception will not" and capture it in MAC CR.

It is up to network implementation not configure the default BWP not contain the initial BWP if UE is receiving broadcast.

Multicast MBS can be supported in MCG side in NE-DC and NR-DC scenarios, i.e., MN terminated MCG bearer kind of MRB.

Remove the editor notes for LCID in broadcast in MAC running CR.

Network may not ensure that all MBS sessions associated one G-RNTI are interested by UE, the proposed spec change is captured in MBS MAC running CR.

A UE may validate a Downlink (DL) Semi-Persistent Scheduling (SPS) assignment Physical Downlink Control Channel (PDCCH) and/or a configured Uplink (UL) grant Type 2 PDCCH for scheduling activation or scheduling release (e.g., deactivation). For example, the UE may validate (for scheduling activation or scheduling release, for example) a DL SPS assignment PDCCH and/or a configured UL grant Type 2 PDCCH if fields (e.g., all fields) for a Downlink Control Information (DCI) format (e.g., PDCCH) are set according to the following conditions (e.g., pre-defined conditions): (i) the Cyclic Redundancy Check (CRC) of the DCI format is scrambled with a Configured Scheduling (CS) Radio Network Temporary Identifier (RNTI) (CS-RNTI) (provided by a "cs-RNTI" parameter, for example) and/or a Group CS-RNTI (G-CS-RNTI) (provided by a "g-cs-RNTI" parameter, for example), (ii) the new data indicator field in the DCI format for the enabled transport block is set to '0', (iii) the DFI flag field, if present, in the DCI format is set to '0', and (iv) if the validation (by the UE, for example) is for scheduling activation and if the PDSCH-to-HARQ_feedback timing indicator field in the DCI format is present, the PDSCH-to-HARQ_feedback timing indicator field does not provide an inapplicable value from dl-DataToUL-ACK-r16. The PDSCH-to-HARQ_feedback timing indicator field may be associated with a Physical Downlink Shared Channel (PDSCH) and/or a Hybrid Automatic Repeat Request (HARD) associated with the PDSCH.

In addition to DL SPS for unicast, DL SPS for multicast may (also) be used for multiple UEs scheduled by network in a semi-persistent manner. A UE may be configured with multiple DL SPS configurations identified by SPS ID (e.g., sps-ConfigIndex) for unicast or multicast. For example, the multiple DL SPS configurations may be differentiated by SPS ID. In an example, a first SPS ID may identify a first DL SPS configuration, a second SPS ID may identify a second DL SPS configuration, etc. In some examples, possible SPS IDs (used to identify DL SPS configurations) may range from 0 to 7.

In some examples, for multicast in RRC_CONNECTED state, DL SPS for multicast (e.g., only DL SPS for multicast) can be activated and/or deactivated by Group Common (GC) PDCCH (GC-PDCCH) with G-CS-RNTI. In some examples, DL SPS for multicast cannot be activated by unicast PDCCH with CS-RNTI, but can be deactivated by unicast PDCCH with CS-RNTI.

If a UE is configured with a single DL SPS configuration, the UE may receive a PDCCH scheduling activation or deactivation for the single DL SPS configuration. According to System A, if a value of a HARQ process number field in the PDCCH is not zero ('0') (e.g., if at least one value of the HARQ process number field is not zero ('0')), the UE may (i) not validate the PDCCH scheduling activation or deactivation, and/or (ii) discard information of the PDCCH (e.g., discard all information of the PDCCH). If the DL SPS configuration is for unicast, a network (e.g., at least one of a base station, a gNB, etc.) can set the value of HARQ process number field to '0' (e.g., the network can always set the value of HARQ Process number field to '0' if the DL SPS configuration is for unicast). However, if the DL SPS configuration is for multicast, it may be difficult and/or restrictive for the network to (always) implement such settings (e.g., limiting the network to always set the value of HARQ process number field to '0' may limit efficiency). In an example, the DL SPS for multicast may be configured for multiple UEs (e.g., the same DL SPS for multicast may be configured for each of the multiple UEs), wherein each of the multiple UEs may have its own set of one or more SPS configurations for multicast and/or unicast. In the example, each SPS configuration for unicast or multicast may be associated with (e.g., may include and/or may be configured with) a unique SPS ID for a UE to know which SPS configuration is activated or deactivated (e.g., the UE may determine whether a SPS configuration is activated or is deactivated based upon a SPS ID associated with the SPS configuration). FIG. 5 illustrates one or more scenarios associated with SPS configuration of UEs A, B, C, D and E. In a table 500 of FIG. 5, SPS ID=0 for unicast is configured for UE A and SPS ID=4 for multicast is configured for UEs A, B, C and D. If a network sends a command associated with activation or deactivation for SPS configuration with SPS ID=4 (e.g., the command may comprise an instruction to activate or deactivate an SPS configuration corresponding to SPS ID=4), UE D may discard the command since the value of a HARQ process number field in the command is not all zero (e.g., the HARQ process number field may be indicative of SPS ID=4). If network wants to avoid such a situation (e.g., if the network wants to avoid the UE D discarding the command), it can set the SPS configuration with SPS ID=0 (e.g., the HARQ process number field may be indicative of SPS ID=0, and thus the value of the HARQ process number field may be zero, such as where all values of the HARQ process number field are set to zero). Alternatively and/or additionally, the network would also need to avoid using SPS ID=0 for SPS configurations (e.g., all SPS configurations) of UE A, B, and C. Accordingly, the configuration flexibility of network using System A may be restricted.

Table 1 provides examples associated with System A. As shown in Table 1, according to System A, even if a UE is configured with a single SPS configuration with SPS ID (e.g., sps-ConfigIndex)=non-zero, the value of the HARQ process number field of the command (e.g., activation or deactivation command) should be still set to zero (e.g., all values of the HARQ process number field should be set to zero for the UE to validate the activation command); otherwise UE would ignore and/or discard the activation command (if the value of the HARQ process number field is not set to all zero, for example).

For example, according to Table 1, if the UE is configured with a single SPS configuration, a value of the HARQ process number field may be set and/or used according to Option 1 regardless of whether or not the UE is configured with sps-ConfigIndex. In Option 1, the UE may determine whether or not to validate the command (e.g., command scheduling and/or instructing activation or deactivation of SPS configuration) based upon whether or not the value of the HARQ process number field is equal to a predefined value (e.g., zero). For example, according to Option 1, the UE may validate the command if (e.g., only if) the value of the HARQ process number field is equal to the predefined value (e.g., zero). Alternatively and/or additionally, according to Option 1, the UE may discard and/or ignore the command if the value of the HARQ process number field is not equal to the predefined value (e.g., the value of the HARQ process number field is non-zero, such as where not all values of the HARQ process number field are set to zero).

Alternatively and/or additionally, according to Table 1, if the UE is configured with multiple SPS configurations, a value of the HARQ process number field may be set and/or used according to Option 2 if the UE is configured with sps-ConfigIndex. In Option 2, the UE may determine sps-ConfigIndex (e.g., a SPS ID of an SPS configuration) based upon the value of the HARQ process number field, and/or may activate or deactivate the SPS configuration identified by the sps-ConfigIndex. For example, in Option 2, the UE may consider the value of the HARQ process number field as a SPS ID of the SPS configuration. Alternatively and/or additionally, in Option 2, the UE may determine whether or not to validate the command based upon one or more other fields (other than HARQ process number field) in the command (e.g., the HARQ process number field may not be used to determine whether or not to validate the command). The UE may activate or deactivate the SPS configuration indicated by the HARQ process number field if the command is validated (e.g., if the command passes validation).

are set to zero). Alternatively and/or additionally, according to Option 3, the UE may discard and/or ignore the command if the value of the HARQ process number field is not equal to the predefined value (e.g., the value of the HARQ process number field is non-zero, such as where not all values of the HARQ process number field are set to zero).

In Option 4, the UE may consider the value of the HARQ process number field as a SPS ID of a SPS configuration, and/or may perform activation or deactivation for the SPS configuration identified by the SPS ID indicated by the HARQ process number field (based upon the command, for example). For example, the UE may activate or deactivate the SPS configuration (based upon the command comprising the HARQ process number field, for example) in response to validating the command. In some examples, in Option 4, the UE may determine whether or not to validate the command based upon one or more other fields (other than HARQ process number field) in the command (e.g., the HARQ process number field may not be used to determine whether or not to validate the command). For example, the HARQ process number field may not be used (e.g., applied and/or considered) in validation of PDCCH. The UE may activate or deactivate the SPS configuration indicated by the HARQ process number field if the command is validated (e.g., if the command passes validation).

In Option 5, the UE may skip the HARQ process number field. For example, the HARQ process number field may not be used (e.g., applied and/or considered) for validation (e.g.,

TABLE 1

| System A | HARQ process number field | |
|---|---|---|
| | UE configured with single SPS configuration | UE configured with multiple SPS configurations |
| No sps-ConfigIndex | for unicast<br>Activation: Option 1<br>Deactivation: Option 1 | X |
| sps-ConfigIndex is configured.<br>(The value may be zero or non-zero.) | for unicast<br>Activation: Option 1<br>Deactivation: Option 1<br>for multicast<br>Activation: Option 1<br>Deactivation: Option 1 | Activation: Option 2<br>Deactivation: Option 2 |

Option 1: Predefined (and/or fixed) value (e.g., all '0's) indicated by HARQ process number field
Option 2: Following sps-ConfigIndex indicated by HARQ process number field (e.g., the value of HARQ process number field indicate which SPS configuration is applied.)

In accordance with one or more of the techniques of the present disclosure, one or more options are provided for handling the HARQ process number field. The one or more options may comprise Option 3, Option 4 and/or Option 5. In Option 3, the UE may determine whether or not to validate the command (e.g., a command scheduling and/or instructing activation or deactivation of SPS configuration) based upon whether or not the value of the HARQ process number field is equal to a predefined value (e.g., zero, such as where all values of the HARQ process number field are set to zero). For example, according to Option 3, the UE may validate the command if (e.g., only if) the value of the HARQ process number field is equal to the predefined value (e.g., the UE may validate the command if all values of the HARQ process number field are set to zero). For example, according to Option 3, the UE may need to check whether or not the value of HARQ process number field is equal to the predefined value (e.g., zero) to determine whether or not validation is achieved (e.g., the UE may need to check whether or not all values of the HARQ process number field the HARQ process number field may not be used for validation of a command comprising the HARQ process number field).

Options 3-5 may be applied for different conditions as shown in Table 2. Different options may be combined as a method (e.g., a specific method) for SPS activation or deactivation for unicast or multicast in different conditions (according to Table 2, for example).

For example, according to Table 2, a command (e.g., activation or deactivation command) may be generated and/or used according to Options 3 and/or 5 and/or a value of a HARQ process number field in the command may be set and/or used according to Options 3 and/or 5 if (i) the UE is configured with a single SPS configuration, (ii) the single SPS configuration is for unicast, and (iii) the UE is not configured with sps-ConfigIndex.

Alternatively and/or additionally, according to Table 2, a command (e.g., activation or deactivation command) may be generated and/or used according to Options 3, 4 and/or 5, and/or a value of a HARQ process number field in the command may be set and/or used according to Options 3, 4 and/or 5 if (i) the UE is configured with a single SPS configuration, (ii) the single SPS configuration is for unicast, and (iii) the UE is configured with sps-ConfigIndex.

Alternatively and/or additionally, according to Table 2, a command (e.g., activation or deactivation command) may be generated and/or used according to Options 4 and/or 5, and/or a value of a HARQ process number field in the command may be set and/or used according to Options 4 and/or 5 if (i) the UE is configured with a single SPS configuration, (ii) the single SPS configuration is for multicast, and (iii) the UE is configured with sps-ConfigIndex.

Alternatively and/or additionally, according to Table 2, a command (e.g., activation or deactivation command) may be generated and/or used according to Options 3 and/or 5, and/or a value of a HARQ process number field in the command may be set and/or used according to Options 3 and/or 5 if (i) the UE is configured with two SPS configurations, (ii) a first SPS configuration of the two SPS configurations is for unicast, (iii) a second SPS configuration of the two SPS configurations is for multicast, (iv) the UE is not configured with sps-ConfigIndex, and/or (v) the command is for activation or deactivation of the first SPS configuration for unicast.

Alternatively and/or additionally, according to Table 2, a command (e.g., activation or deactivation command) may be generated and/or used according to Options 3, 4 and/or 5, and/or a value of a HARQ process number field in the command may be set and/or used according to Options 3, 4 and/or 5 if (i) the UE is configured with two SPS configurations, (ii) a first SPS configuration of the two SPS configurations is for unicast, (iii) a second SPS configuration of the two SPS configurations is for multicast, and (iv) the UE is configured with sps-ConfigIndex.

Alternatively and/or additionally, according to Table 2, a command (e.g., activation or deactivation command) may be generated and/or used according to Options 3 and/or 5, and/or a value of a HARQ process number field in the command may be set and/or used according to Options 3 and/or 5 if (i) the UE is configured with more than two SPS configurations, (ii) a first SPS configuration of the more than two SPS configurations is for unicast, and (iii) the UE is not configured with sps-ConfigIndex.

Alternatively and/or additionally, according to Table 2, a command (e.g., activation or deactivation command) may be generated and/or used according to Options 3, 4 and/or 5, and/or a value of a HARQ process number field in the command may be set and/or used according to Options 3, 4 and/or 5 if (i) the UE is configured with more than two SPS configurations, (ii) a first SPS configuration of the more than two SPS configurations is for unicast, (iii) the UE is configured with sps-ConfigIndex, and/or (iv) the command is for activation or deactivation of the first SPS configuration for unicast.

Alternatively and/or additionally, according to Table 2, a command (e.g., activation or deactivation command) may be generated and/or used according to Option 4, and/or a value of a HARQ process number field in the command may be set and/or used according to Option 4 if (i) the UE is configured with more than two SPS configurations, (ii) a first SPS configuration of the more than two SPS configurations is for unicast, (iii) one or more second SPS configurations of the more than two SPS configurations are for multicast, (iv) the UE is configured with sps-ConfigIndex, and/or (v) the command is for activation or deactivation of the one or more second SPS configurations for multicast.

Alternatively and/or additionally, according to Table 2, a command (e.g., activation or deactivation command) may be generated and/or used according to Option 4, and/or a value of a HARQ process number field in the command may be set and/or used according to Option 4 if (i) the UE is configured with more than two SPS configurations comprising one or more SPS configurations for unicast and one or more SPS configurations for multicast, (ii) the UE is configured with sps-ConfigIndex, and/or (iii) the command is for activation or deactivation of the one or more SPS configurations for unicast and the one or more SPS configurations for multicast.

TABLE 2

Example Embodiments for DL SPS.

| Example Embodiments | Single SPS configuration | Two SPS configurations | More than two SPS configurations |
|---|---|---|---|
| | | HARQ process number field | |
| No sps-ConfigIndex | For unicast Activation: Option 3, 5 Deactivation: Option 3, 5 | Single for unicast Activation: Option 3, 5 Deactivation: Option 3, 5 | Single for unicast Activation: Option 3, 5 Deactivation: Option 3, 5 |
| sps-ConfigIndex is configured. (The value may be zero or non-zero.) | For unicast Activation: 3 or 4 or 5 Deactivation: 3 or 4 or 5 For multicast Activation: 4 or 5 Deactivation: 4 or 5 | Single for unicast Activation: 3 or 4 or 5 Deactivation: 3 or 4 or 5 Single for multicast Activation: 3 or 4 or 5 Deactivation: 3 or 4 or 5 | Single for unicast Activation: 3 or 4 or 5 Deactivation: 3 or 4 or 5 The others for multicast Activation: Option 4 Deactivation: Option 4 For unicast and multicast Deactivation: Option 4 Activation: Option 4 |

Option 3: Predefined (and/or fixed) value (e.g., all '0's) indicated by HARQ process number field Option 4: Following sps-ConfigIndex indicated by HARQ process number field (e.g., the value of HARQ process number field indicate which SPS configuration is applied.)

Option 5: Skipping HARQ process number field

In an example, if two SPS configurations are configured for unicast and multicast respectively and SPS ID is not configured for unicast, UE may check whether or not the value of HARQ process number field is equal to zero (according to Option 3) or may skip the field (according to Option 5) in response to (e.g., when) receiving a command (e.g., activation or deactivation command) on PDCCH addressed to CS-RNTI.

In an example, if a single SPS configuration with a SPS ID is configured for multicast (and no other SPS configuration is configured for unicast, for example), UE may consider the value of HARQ process number field as the SPS ID of SPS configuration and may perform activation or deactivation for the corresponding SPS configuration corresponding to the SPS ID indicated by the value of the HARQ process number field (according to Option 4) or skip the field (according to Option 5) in response to (e.g., when) receiving a command (e.g., activation or deactivation command) on PDCCH addressed to G-CS-RNTI.

In accordance with one or more of the techniques of the present disclosure, one or more options are provided for handling the HARQ process number field in scenarios associated with configured grant (CG) and/or UL SPS. The one or more options may comprise Option 6, Option 7 and/or Option 8, which may be applied in different conditions shown in Table 3.

In Option 6, the UE may determine whether or not to validate a command (e.g., command scheduling and/or instructing activation or deactivation of a UL SPS configuration and/or a CG configuration) based upon whether or not the value of the HARQ process number field is equal to a predefined value (e.g., zero, such as where all values of the HARQ process number field are set to zero). For example, according to Option 6, the UE may validate the command if (e.g., only if) the value of the HARQ process number field is equal to the predefined value (e.g., the UE may validate the command if all values of the HARQ process number field are set to zero).

In Option 7, the UE may consider the value of the HARQ process number field as an identifier (e.g., ConfiguredGrantConfigIndex) indicating a configuration (e.g., a UL SPS configuration and/or a CG configuration), and/or may perform activation or deactivation for the configuration identified by the HARQ process number field (based upon the command, for example). For example, the UE may activate or deactivate the configuration (based upon the command comprising the HARQ process number field, for example) in response to validating the command. In some examples, in Option 7, the UE may determine whether or not to validate the command based upon one or more other fields (other than HARQ process number field) in the command (e.g., the HARQ process number field may not be used to determine whether or not to validate the command). For example, the HARQ process number field may not be used (e.g., applied and/or considered) in validation of PDCCH.

In Option 8, the UE may skip the HARQ process number field. For example, the HARQ process number field may not be used (e.g., applied and/or considered) for validation (e.g., the HARQ process number field may not be used for validation of a command comprising the HARQ process number field).

For example, according to Table 3, a command (e.g., activation or deactivation command) may be generated and/or used according to Options 6 and/or 8 and/or a value of a HARQ process number field in the command may be set and/or used according to Options 6 and/or 8 if (i) the UE is configured with a single CG configuration, and (ii) the UE is not configured with ConfiguredGrantConfigIndex.

Alternatively and/or additionally, according to Table 3, a command (e.g., activation or deactivation command) may be generated and/or used according to Options 7 and/or 8 and/or a value of a HARQ process number field in the command may be set and/or used according to Options 7 and/or 8 if (i) the UE is configured with a single CG configuration, and (ii) the UE is configured with ConfiguredGrantConfigIndex.

Alternatively and/or additionally, according to Table 3, a command (e.g., activation or deactivation command) may be generated and/or used according to Option 7 and/or a value of a HARQ process number field in the command may be set and/or used according to Option 7 if (i) the UE is configured with multiple CG configurations, and (ii) the UE is configured with ConfiguredGrantConfigIndex.

TABLE 3

Example Embodiments for UL SPS/CG.

| | HARQ process number field | |
|---|---|---|
| Example Embodiments | Single Configured Grant (CG) configuration | More than one CG configuration |
| No ConfiguredGrantConfigIndex | Activation: Option 6 or 8 Deactivation: Option 6 or | X |
| ConfiguredGrantConfigIndex is configured. (The value may be zero or non-zero.) | Activation: 7 or 8 Deactivation: 7 or 8 | Activation: Option 7 Deactivation: Option 7 |

Option 6: Predefined (and/or fixed) value (e.g., all '0's) indicated by HARQ process number field
Option 7: Following ConfiguredGrantConfigIndex indicated by HARQ process number field (e.g., the value of HARQ process number field indicate which SPS/CG configuration is applied.)
Option 8: Skipping HARQ process number field According to System A, a network can use either sps-Config or sps-ConfigToAddModList to configure a UE with a DL SPS configuration for unicast (e.g., only one DL SPS configuration for unicast). For example, the DL SPS configuration may correspond to the only DL SPS configuration that the UE is configured with. In some examples, using sps-Config (instead of sps-ConfigToAddModList, for example) is more efficient, more straightforward and/or reduces overhead (e.g., saves some signaling overhead) of a Radio Resource Control (RRC) message (e.g., a RRC message that carries sps-Config). For example, using sps-Config (instead of sps-ConfigToAddModList, for example) may be more efficient, more straightforward and/or may reduce overhead due to there being only one DL SPS configuration (with which the UE is configured, for example). However, if at least one DL SPS configuration for multicast is also configured at the same time (e.g., at the same time as the unicast DL SPS configuration configured via the sps-Config), validation of SPS activation or deactivation for the unicast DL SPS configuration may have some problems. In this case, more than one DL SPS configuration is configured so the value of HARQ process number field would indicate which SPS configuration is applied for the activation or deactivation if validation is achieved. However, there is no SPS ID configured for the unicast DL SPS configuration so it may be difficult or impossible for network to do activation or deactivation (e.g., the network may not be able to identify the unicast DL SPS configuration since there is no SPS ID configured for the unicast DL SPS configuration via sps-Config).

In accordance with one or more of the techniques of the present disclosure, Embodiment 1, Embodiment 2 and Embodiment 3 are provided.

Embodiment 1

In Embodiment 1, the network may configure a SPS ID (e.g., using sps-ConfigToAddModList) for a unicast SPS configuration (e.g., the only one SPS configuration with which the UE is configured). For example, the network may always configure a SPS ID (e.g., using sps-ConfigToAddModList) for unicast SPS configurations that the network configures for UEs (e.g., the network may not configure a UE with a unicast SPS configuration without a SPS ID).

Alternatively and/or additionally, in Embodiment 1, the network may not concurrently (e.g., simultaneously) configure a UE with (i) SPS (e.g., unicast SPS) for a UE using sps-Config for unicast (e.g., a unicast SPS configuration with no SPS ID) and (ii) SPS (e.g., multicast SPS) for the UE using sps-ConfigMulticastToAddModList for multicast (e.g., a multicast SPS configuration having a SPS ID). For example, the UE may not concurrently (e.g., simultaneously) be configured with both a unicast SPS configuration (with no SPS ID, for example) configured via sps-Config for unicast and a multicast SPS configuration (with SPS ID) via sps-ConfigMulticastToAddModList for multicast. Alternatively and/or additionally, in Embodiment 1, the network may not concurrently (e.g., simultaneously) configure a UE with (i) SPS (e.g., unicast SPS) in a first Bandwidth Part (BWP) (e.g., one BWP) for a UE using sps-Config for unicast (e.g., a unicast SPS configuration with no SPS ID) and (ii) SPS (e.g., multicast SPS) in the first BWP for the UE using sps-ConfigMulticastToAddModList for multicast (e.g., a multicast SPS configuration having a SPS ID). For example, in the first BWP (e.g., the one BWP), the UE may not concurrently (e.g., simultaneously) be configured with both a unicast SPS configuration (with no SPS ID, for example) configured via sps-Config for unicast and a multicast SPS configuration (with SPS ID) via sps-ConfigMulticastToAddModList for multicast.

Embodiment 2

In Embodiment 2, the UE may check (e.g., further check) whether or not a command (e.g., an activation or deactivation command) is for unicast. If the command is for unicast, the UE may (i) use the HARQ process number field in the command to determine whether or not to validate the command (e.g., the HARQ process number field may be considered and/or applied in validation of the command), such as where the UE validates the command if (e.g., only if) the value of the HARQ process number field is equal to the predefined value (e.g., zero, such as where all values of the HARQ process number field are set to zero) or (ii) skip the HARQ process number field (e.g., the HARQ process number field may not be used for validation).

Embodiment 3

In Embodiment 3, the UE may consider the SPS ID of unicast SPS configuration (e.g., the only one SPS configuration with which the UE is configured) to be zero (e.g., the UE may not be configured with a SPS ID for the unicast SPS configuration, and/or the UE may assume that the SPS ID of the unicast SPS configuration is zero), wherein the UE may not use the HARQ process number field in validation of the command comprising the HARQ process number field (e.g., the UE may not use the HARQ process number field to determine whether or not to validate the command).

For saving signaling (e.g., reducing signaling overhead) and/or reducing latency, network can configure UE a SPS deactivation state list including multiple deactivation states. Each state entry (of the SPS deactivation state list) can be mapped to one or more SPS configurations to be deactivated. When UE receives a deactivation command on PDCCH, the HARQ process number field of the PDCCH may be used to indicate which state is applied for deactivation. In an example shown in FIG. 5, UE C is configured with four SPS configurations (e.g., unicast SPS configurations associated with SPS ID 2 and SPS ID 3, and multicast SPS configurations associated with SPS ID 4 and SPS ID 5) and a deactivation list including six deactivation states (e.g., 1, 2, 3, 4, 5 and 6). A first deactivation state "1" corresponds to SPS ID 2 and SPS ID 3, a second deactivation state "2" corresponds to SPS ID 2, a third deactivation state "3" corresponds to SPS ID 3, a fourth deactivation state "4" corresponds to SPS ID 4, a fifth deactivation state "5" corresponds to SPS ID 5, and/or a sixth deactivation state "6" corresponds to SPS ID 2, SPS ID 3 and SPS ID 5. If UE C receives deactivation command with the value of the HARQ process number field=6 (e.g., the HARQ process number field indicates that the deactivation command is applicable to SPS configurations associated with the sixth deactivation state "6"), UE C may deactivate three SPS configurations with SPS ID=2, 3, and 5 (associated with the sixth deactivation state "6"). For example, the three SPS configurations may be deactivated (in response to the deactivation command, for example) at the same time. How to design a deactivation state list for multicast DL SPS operation can be further analyzed.

One or more of the techniques provided herein may be used for implementing (e.g., designing) a deactivation state list for multicast DL SPS operation. In an example shown in FIG. 5, if a UE is already configured with a deactivation list for unicast DL SPS, the UE may or may not apply the deactivation list for G-CS-RNTI with which the UE is configured (e.g., all G-CS-RNTI with which the UE is configured).

In some examples, the network may configure whether or not G-CS-RNTI with which the UE is configured (e.g., all G-CS-RNTI with which the UE is configured) can be applied for the deactivation list (e.g., whether or not the deactivation list is applicable to all G-CS-RNTI with which the UE is configured).

In some examples, for each G-CS-RNTI with which the UE is configured, the network may configure whether or not the deactivation list is applied to the G-CS-RNTI. In an example, even if a state in the deactivation list is associated with (e.g., includes) a SPS ID for multicast, the UE may not apply the list for one or more G-CS-RNTIs with which the UE is configured (e.g., the UE may not apply the list for all G-CS-RNTIs with which the UE is configured).

In some examples, the deactivation list may correspond to a shared list shared among the UE and other UEs of a group of UEs (e.g., the UE and the other UEs may be configured with the deactivation list. In some examples, the deactivation list may be used according to table 520 (e.g., the deactivation list may correspond to "One List" in table 520). In some examples, according to table 520, whether or not the deactivation list is applicable to one or more CS-RNTIs (with which the UE is configured) may be based upon one or more techniques associated with System A and/or other systems.

In some examples, the UE may be configured with a first list (e.g., a first deactivation list) for unicast and a second list (e.g., a second deactivation list) for multicast. The first list may correspond to "List 1" in table 520 of FIG. 5, and/or may be used in association with one or more CS-RNTIs (with which the UE is configured). The second list may correspond to "List 2" in table 520 of FIG. 5, and/or may be used in association with one or more G-CS-RNTIs (e.g., all G-CS-RNTIs) with which the UE is configured.

In some examples, the network may configure G-CS-RNTIs (e.g., all G-CS-RNTIs with which the UE is configured) to be applicable to the second list for multicast. For example, the UE may apply the second list for multicast to G-CS-RNTIs (e.g., all G-CS-RNTIs with which the UE is configured). For example, the UE may apply the second list for multicast to G-CS-RNTIs (e.g., all G-CS-RNTIs with which the UE is configured) based upon a configuration provided (by the network, for example) to the UE.

In some examples, for each G-CS-RNTI with which the UE is configured, the network may configure whether or not the second list for multicast is applied to the G-CS-RNTI. In an example, even if a state in the second list for multicast is associated with (e.g., includes) a SPS ID for multicast, the UE may not apply the second list for multicast for one or more G-CS-RNTIs with which the UE is configured (e.g., the UE may not apply the second list for multicast for all G-CS-RNTIs with which the UE is configured).

In some examples, the UE may be configured with multiple lists, wherein each list of the multiple lists can be linked to one or more G-CS-RNTIs (e.g., one or more G-CS-RNTIs with which the UE is configured). For example, the UE may be configured with multiple lists for multicast (e.g., multiple deactivation lists for multicast), wherein each list of the multiple lists is applied to one or more G-CS-RNTIs (with which the UE is configured, for example).

In some examples, a G-CS-RNTI (e.g., each G-CS-RNTI) may be configured with a dedicated list (e.g., the dedicated list may only be applied to the G-CS-RNTI). For example, the UE may be configured with one or more dedicated lists, wherein each dedicated list is used in association with a G-CS-RNTI.

In some examples, if (i) the UE is configured with one deactivation state list (e.g., the UE is configured with only the one deactivation list) and (ii) no SPS configuration for unicast is configured (e.g., the UE is not configured with any SPS configuration for unicast), the UE may consider the deactivation state list as being applicable for multicast (e.g., the UE may apply the deactivation state list for one or more G-CS-RNTIs with which the UE is configured). Alternatively and/or additionally, if (i) the UE is configured with one deactivation state list (e.g., the UE is configured with only the one deactivation list) and (ii) a SPS configuration for unicast (e.g., any SPS configuration for unicast) is configured (e.g., the UE is configured with any SPS configuration for unicast), the UE may not consider the deactivation state list as being applicable for multicast (e.g., the UE may not apply the deactivation state list for G-CS-RNTIs with which the UE is configured). Accordingly, whether or not the UE applies the one deactivation state list may depend upon whether or not SPS configuration for unicast is configured (e.g., whether or not the UE is configured with any SPS configuration for unicast).

In some examples, considering not all UEs in the same group (e.g., a group of UEs using the same G-CS-RNTI) have the same SPS configurations for multicast and/or unicast, the network may assign (e.g., always assign) a SPS ID of multicast to a deactivation state with a state entry equal to the SPS ID. In an example shown in FIG. 5, UE C is configured with SPS ID=4 and 5 for multicast, wherein the SPS ID=4 is assigned to a state entry=4 (e.g., the fourth deactivation state "4") and/or the SPS ID=5 is assigned to a state entry=5 (e.g., the fifth deactivation state "5"). For example, the state entry=4 may cover SPS ID=4 and/or the state entry=5 may cover SPS ID=5. In an example, the UE (e.g., UE C) may use a deactivation state list (and/or one or more other deactivation state lists) for both unicast (e.g., CS-RNTI) and multicast (e.g., one or more G-CS-RNTIs).

To enhance 3GPP specification for wireless communication in accordance with some embodiments herein, Enhancements 1-4 are provided herein. Enhancements 1-4 are reflective of implementation in accordance with some embodiments herein, and comprise modifications to various sections of 3GPP specifications. According to some embodiments, one, some and/or all of Enhancements 1-4 may be implemented and/or a portion of one, some and/or all of Enhancements 1-4 may be implemented.

Enhancements 1-2 comprises modifications to Section 5.4.6 (entitled "Power Headroom Reporting") of 3GPP 38.321 v16.6.0.

In Enhancement 1, additions 1-3 and/or removals 1-3 are made to Section 10.2 of R1-2202951. To distinguish addition X (e.g., addition 1, addition 2, addition 3) from what is originally included in Section 10.2 of R1-2202951, addition X is in bold, and is preceded by the term "ADDITION X STARTS:" (e.g., "ADDITION 1 STARTS:") and followed by the term "ADDITION X ENDS" (e.g., "ADDITION 1 ENDS"). To show which portion of Section 10.2 of R1-2202951 is removed via removal X (e.g., removal 1, removal 2, removal 3), removal X is in bold, and is preceded by the term "REMOVAL X STARTS:" (e.g., "REMOVAL 1 STARTS:") and followed by the term "REMOVAL X ENDS" (e.g., "REMOVAL 1 ENDS").

Enhancement 1:
10.2 PDCCH validation for DL SPS and UL grant Type 2
A UE validates, for scheduling activation or scheduling release, a DL SPS assignment PDCCH or a configured UL grant Type 2 PDCCH if
If a UE is provided a single configuration for UL grant Type 2 PUSCH or for SPS PDSCH ADDITION 1 STARTS: of unicast ADDITION 1 ENDS, validation of the DCI format is achieved if all fields for the DCI format are set according to Table 10.2-1 or Table 10.2-2.
If a UE is provided more than one configuration for UL grant Type 2 PUSCH or for SPS PDSCH ADDITION 2 STARTS: or a single configuration for SPS PDSCH of multicast ADDITION 2 ENDS, a value of the HARQ process number field in a DCI format indicates an activation for a corresponding UL grant Type 2 PUSCH or for a SPS PDSCH configuration with a same value as provided by ConfiguredGrantConfigIndex or by sps-ConfigIndex, respectively. Validation of the DCI format is achieved if the RV field for the DCI format is set as in Table 10.2-3.

If a UE is provided more than one configuration for UL grant Type 2 PUSCH or for SPS PDSCH ADDITION 3 STARTS: or a single configuration for SPS PDSCH of multicast ADDITION 3 ENDS if the UE is provided ConfiguredGrantConfigType2DeactivationStateList or sps-ConfigDeactivationStateList, a value of the HARQ process number field in a DCI format indicates a corresponding entry for scheduling release of one or more UL grant Type 2 PUSCH or SPS PDSCH configurations if the UE is not provided ConfiguredGrantConfigType2DeactivationStateList or sps-ConfigDeactivationStateList, a value of the HARQ process number field in a DCI format indicates a release for a corresponding UL grant Type 2 PUSCH or for a SPS PDSCH configuration with a same value as provided by ConfiguredGrantConfigIndex or by sps-ConfigIndex, respectively Validation of the DCI format is achieved if all fields for the DCI format are set according to Table 10.2-4.

TABLE 10.2-1

Special fields for single DL SPS or single UL grant Type 2 scheduling activation PDCCH validation when a UE is provided a single SPS PDSCH or UL grant Type 2 configuration in the active DL/UL BWP of the scheduled cell

| | DCI format 0_0/0_1/0_2 | DCI format 1_0/1_2/ REMOVAL 1 STARTS: 4_1 REMOVAL 1 ENDS | DCI format 1_1/ REMOVAL 2 STARTS: 4_2 REMOVAL 2 ENDS |
|---|---|---|---|
| HARQ process number | set to all '0's | set to all '0's | set to all '0's |
| Redundancy version | set to all '0's | set to all '0's | For the enabled transport block: set to all '0's |

TABLE 10.2-2

Special fields for single DL SPS or single UL grant Type 2 scheduling release PDCCH validation when a UE is provided a single SPS PDSCH or UL grant Type 2 configuration in the active DL/UL BWP of the scheduled cell

| | DCI format 0_0/0_1/0_2 | DCI format 1_0/1_1/1_2/ REMOVAL 3 STARTS: 4_1/4_2 REMOVAL 3 ENDS |
|---|---|---|
| HARQ process number | set to all '0's | set to all '0's |
| Redundancy version | set to all '0's | set to all '0's |
| Modulation and coding scheme | set to all '1's | set to all '1's |
| Frequency domain resource assignment | set to all '0's for FDRA Type 2 with μ = 1 set to all '1's, otherwise | set to all '0's for FDRA Type 0 or for dynamicSwitch set to all '1's for FDRA Type 1 |

In Enhancement 2, additions 4-7 and/or removals 4-9 are made to Section 10.2 of R1-2202951. To distinguish addition X (e.g., addition 4, addition 5, addition 6, addition 7) from what is originally included in Section 10.2 of R1-2202951, addition X is in bold, and is preceded by the term "ADDITION X STARTS:" (e.g., "ADDITION 4 STARTS:") and followed by the term "ADDITION X ENDS" (e.g., "ADDITION 4 ENDS"). To show which portion of Section 10.2 of R1-2202951 is removed via removal X (e.g., removal 4, removal 5, removal 6, removal 7, removal 8, removal 9), removal X is in bold, and is preceded by the term "REMOVAL X STARTS:" (e.g., "REMOVAL 4 STARTS:") and followed by the term "REMOVAL 4 ENDS" (e.g., "REMOVAL 1 ENDS").

Enhancement 2:

10.2 PDCCH Validation for DL SPS and UL Grant Type 2

A UE validates, for scheduling activation or scheduling release, a DL SPS assignment PDCCH or a configured UL grant Type 2 PDCCH if If a UE is ADDITION 4 STARTS: not ADDITION 4 ENDS provided ADDITION 5 STARTS: ConfiguredGrantConfigIndex or sps-ConfigIndex ADDITION 5 ENDS REMOVAL 4 STARTS: a single configuration REMOVAL 4 ENDS for UL grant Type 2 PUSCH or for SPS PDSCH, validation of the DCI format is achieved if all fields for the DCI format are set according to Table 10.2-1 or Table 10.2-2.

If a UE is provided ADDITION 6 STARTS: ConfiguredGrantConfigIndex or sps-ConfigIndex ADDITION 6 ENDS REMOVAL 5 STARTS: more than one configuration REMOVAL 5 ENDS for UL grant Type 2 PUSCH or for SPS PDSCH, a value of the HARQ process number field in a DCI format indicates an activation for a corresponding UL grant Type 2 PUSCH or for a SPS PDSCH configuration with a same value as provided by ConfiguredGrantConfigIndex or by sps-ConfigIndex, respectively. Validation of the DCI format is achieved if the RV field for the DCI format is set as in Table 10.2-3.

If a UE is provided ADDITION 7 STARTS: ConfiguredGrantConfigIndex or sps-ConfigIndex ADDITION 7 ENDS REMOVAL 6 STARTS: more than one configuration REMOVAL 6 ENDS for UL grant Type 2 PUSCH or for SPS PDSCH if the UE is provided ConfiguredGrantConfigType2DeactivationStateList or sps-ConfigDeactivationStateList, a value of the HARQ process number field in a DCI format indicates a corresponding entry for scheduling release of one or more UL grant Type 2 PUSCH or SPS PDSCH configurations if the UE is not provided ConfiguredGrantConfigType2DeactivationStateList or sps-ConfigDeactivationStateList, a value of the HARQ process number field in a DCI format indicates a release for a corresponding UL grant Type 2 PUSCH or for a SPS PDSCH configuration with a same value as provided by ConfiguredGrantConfigIndex or by sps-ConfigIndex, respectively Validation of the DCI format is achieved if all fields for the DCI format are set according to Table 10.2-4.

TABLE 10.2-1

Special fields for single DL SPS or single UL grant Type 2 scheduling activation PDCCH validation when a UE is provided a single SPS PDSCH or UL grant Type 2 configuration in the active DL/UL BWP of the scheduled cell

| | DCI format 0_0/0_1/0_2 | DCI format 1_0/1_2/ REMOVAL 7 STARTS: 4_1 REMOVAL 7 ENDS | DCI format 1_1/ REMOVAL 8 STARTS: 4_2 REMOVAL 8 ENDS |
|---|---|---|---|
| HARQ process number | set to all '0's | set to all '0's | set to all '0's |
| Redundancy version | set to all '0's | set to all '0's | For the enabled transport block: set to all '0's |

TABLE 10.2-2

Special fields for single DL SPS or single UL grant Type 2 scheduling release PDCCH validation when a UE is provided a single SPS PDSCH or UL grant Type 2 configuration in the active DL/UL BWP of the scheduled cell

| | DCI format 0_0/0_1/0_2 | DCI format 1_0/1_1/1_2/ REMOVAL 9 STARTS: 4_1/4_2 REMOVAL 9 ENDS |
|---|---|---|
| HARQ process number | set to all '0's | set to all '0's |
| Redundancy version | set to all '0's | set to all '0's |

TABLE 10.2-2-continued

Special fields for single DL SPS or single UL grant Type 2 scheduling release PDCCH validation when a UE is provided a single SPS PDSCH or UL grant Type 2 configuration in the active DL/UL BWP of the scheduled cell

| | DCI format 0_0/0_1/0_2 | DCI format 1_0/1_1/1_2/ REMOVAL 9 STARTS: 4_1/4_2 REMOVAL 9 ENDS |
|---|---|---|
| Modulation and coding scheme | set to all '1's | set to all '1's |
| Frequency domain resource assignment | set to all '0's for FDRA Type 2 with $\mu = 1$ set to all '1's, otherwise | set to all '0's for FDRA Type 0 or for dynamicSwitch set to all '1's for FDRA Type 1 |

In Enhancement 3, additions 8-9 are made to R2-2204251. To distinguish addition X (e.g., addition 8, addition 9) from what is originally included in R2-2204251, addition X is in bold, and is preceded by the term "ADDITION X STARTS:" (e.g., "ADDITION 8 STARTS:") and followed by the term "ADDITION X ENDS" (e.g., "ADDITION 8 ENDS").

Enhancement 3:

| BWP-DownlinkDedicated field descriptions |
|---|
| beamFailureRecoverySCellConfig |
| Configuration of candidate RS for beam failure recovery in SCells. |
| cfr-ConfigMulticast |
| UE specific common frequency resource configuration for MBS multicast for one dedicated BWP. This field can be configured within at most one serving cell. |
| pdcch-Config |
| UE specific PDCCH configuration for one BWP. |
| pdsch-Config |
| UE specific PDSCH configuration for one BWP. |
| sps-Config |
| UE specific SPS (Semi-Persistent Scheduling) configuration for one BWP. Except for reconfiguration with sync, the NW does not reconfigure sps-Config when there is an active configured downlink assignment (see TS 38.321 [3]). However, the NW may release the sps-Config at any time. Network can only configure SPS ADDITION 8 STARTS: for unicast ADDITION 8 ENDS in one BWP using either this field or sps-ConfigToAddModList. ADDITION 9 STARTS: Network does not configure SPS in one BWP using this field and sps-ConfigMulticastToAddModList-r17 simultaneously. ADDITION 9 ENDS |
| sps-ConfigDeactivationStateList |
| Indicates a list of the deactivation states in which each state can be mapped to a single or multiple SPS configurations to be deactivated, see clause 10.2 in TS 38.213 [13]. If a state is mapped to multiple SPS configurations, each of these SPS configurations is configured with the same harq-CodebookID. |
| sps-ConfigToAddModList |
| Indicates a list of one or more DL SPS configurations to be added or modified in one BWP. Except for reconfiguration with sync, the NW does not reconfigure a SPS configuration when it is active (see TS 38.321 [3]). |
| sps-ConfigToReleaseList |
| Indicates a list of one or more DL SPS configurations to be released. The NW may release a SPS configuration at any time. |

| BWP-DownlinkDedicated field descriptions |
| --- |
| radioLinkMonitoringConfig |
| UE specific configuration of radio link monitoring for detecting cell- and beam radio link failure occasions. The maximum number of failure detection resources should be limited up to 8 for both cell and beam radio link failure detection. For SCells, only periodic 1-port CSI-RS can be configured in IE RadioLinkMonitoringConfig. |
| sl-PDCCH-Config |
| Indicates the UE specific PDCCH configurations for receiving the SL grants (via SL-RNTI or SL-CS-RNTI) for NR sidelink communication. |
| sl-V2X-PDCCH-Config |
| Indicates the UE specific PDCCH configurations for receiving SL grants (i.e. sidelink SPS) for V2X sidelink communication. |

In Enhancement 4, addition 10-13 are made to R2-2204251. To distinguish addition X (e.g., addition 10, addition 11, addition 12, addition 13) from what is originally included in R2-2204251, addition X is in bold, and is preceded by the term "ADDITION X STARTS:" (e.g., "ADDITION 10 STARTS:") and followed by the term "ADDITION X ENDS" (e.g., "ADDITION 10 ENDS").

Enhancement 4:

SPS-Config

The IE SPS-Config is used to configure downlink semi-persistent transmission. Multiple Downlink SPS configurations may be configured in one BWP of a serving cell.

| SPS-Config information element |
| --- |

```
-- ASN1START
-- TAG-SPS-CONFIG-START
SPS-Config ::=                     SEQUENCE {
    periodicity                    ENUMERATED {ms10, ms20, ms32,
ms40, ms64, ms80, ms128, ms160, ms320, ms640,
                                              spare6,
spare5, spare4, spare3, spare2, spare1},
    nrofHARQ-Processes             INTEGER (1..8),
    n1PUCCH-AN                     PUCCH-ResourceId
OPTIONAL,   -- Need M
    mcs-Table                      ENUMERATED {qam64LowSE}
OPTIONAL,   -- Need S
    ...,
    [[
    sps-ConfigIndex-r16            SPS-ConfigIndex-r16
OPTIONAL,   ADDITION 10 STARTS: -- Cond SPS-List ADDITION 10 ENDS
    harq-ProcID-Offset-r16         INTEGER (0..15)
OPTIONAL,   -- Need R
    periodicityExt-r16             INTEGER (1..5120)
OPTIONAL,   -- Need R
    harq-CodebookID-r16            INTEGER (1..2)
OPTIONAL,   -- Need R
    pdsch-AggregationFactor-r16    ENUMERATED {n1, n2, n4, n8 }
OPTIONAL    -- Need S
    ]]
}
-- TAG-SPS-CONFIG-STOP
-- ASN1STOP
...
```

| SPS-Config field descriptions |
| --- |
| ... |
| sps-ConfigIndex |
| Indicates the index of one of multiple SPS configurations. ADDITION 11 STARTS: Network can only configure this field to 0 if (only) a single DL SPS configuration (for multicast) is configured. ADDITION 11 ENDS ADDITION 12 STARTS: Network can only configure this field to 0 if (only) a single sps-ConfigIndex-r16 (for multicast) is configured. ADDITION 12 ENDS |

| Conditional Presence | Explanation |
| --- | --- |
| SPS-List | The field is mandatory present when included in sps-Config ToAddModList-r16 ADDITION 13 STARTS: or SPS-ConfigMulticastToAddModList-r17, ADDITION 13 ENDS otherwise the field is absent. |

One, some and/or all of the examples, options, techniques and/or embodiments disclosed herein can be formed and/or combined to a new embodiment.

In some examples, embodiments disclosed herein, such as embodiments described with respect to each of Options 1-8 and/or Embodiments 1-3, may be implemented independently and/or separately. Alternatively and/or additionally, a combination of embodiments described herein, such as embodiments described with respect to one, some and/or all of Options 1-8 and/or Embodiments 1-3, may be implemented. Alternatively and/or additionally, a combination of embodiments described herein, such as embodiments described with respect to one, some and/or all of Options 1-8 and/or Embodiments 1-3, may be implemented concurrently and/or simultaneously.

Various techniques, embodiments, methods and/or alternatives of the present disclosure may be performed independently and/or separately from one another. Alternatively and/or additionally, various techniques, embodiments, methods and/or alternatives of the present disclosure may be combined and/or implemented using a single system. Alternatively and/or additionally, various techniques, embodiments, methods and/or alternatives of the present disclosure may be implemented concurrently and/or simultaneously.

In some embodiments, in the present disclosure, one, some and/or all instances of the term "sps-ConfigIndex information element" may be replaced with and/or used interchangeably with the term "sps-ConfigIndex", the term "sps-ConfigIndex parameter", and/or the term "sps-ConfigIndex field".

In some embodiments, in the present disclosure, one, some and/or all instances of the term "sps-Config information element" may be replaced with and/or used interchangeably with the term "sps-Config", the term "sps-Config parameter", and/or the term "sps-Config field".

In some embodiments, in the present disclosure, one, some and/or all instances of the term "sps-ConfigToAddModList information element" may be replaced with and/or used interchangeably with the term "sps-ConfigToAddModList", the term "sps-ConfigToAddModList parameter", and/or the term "sps-ConfigToAddModList field".

In some embodiments, in the present disclosure, one, some and/or all instances of the term "sps-ConfigMulticastToAddModList information element" may be replaced with and/or used interchangeably with the term "sps-ConfigMulticastToAddModList", the term "sps-ConfigMulticastToAddModList parameter", and/or the term "sps-ConfigMulticastToAddModList field".

Figure 6:
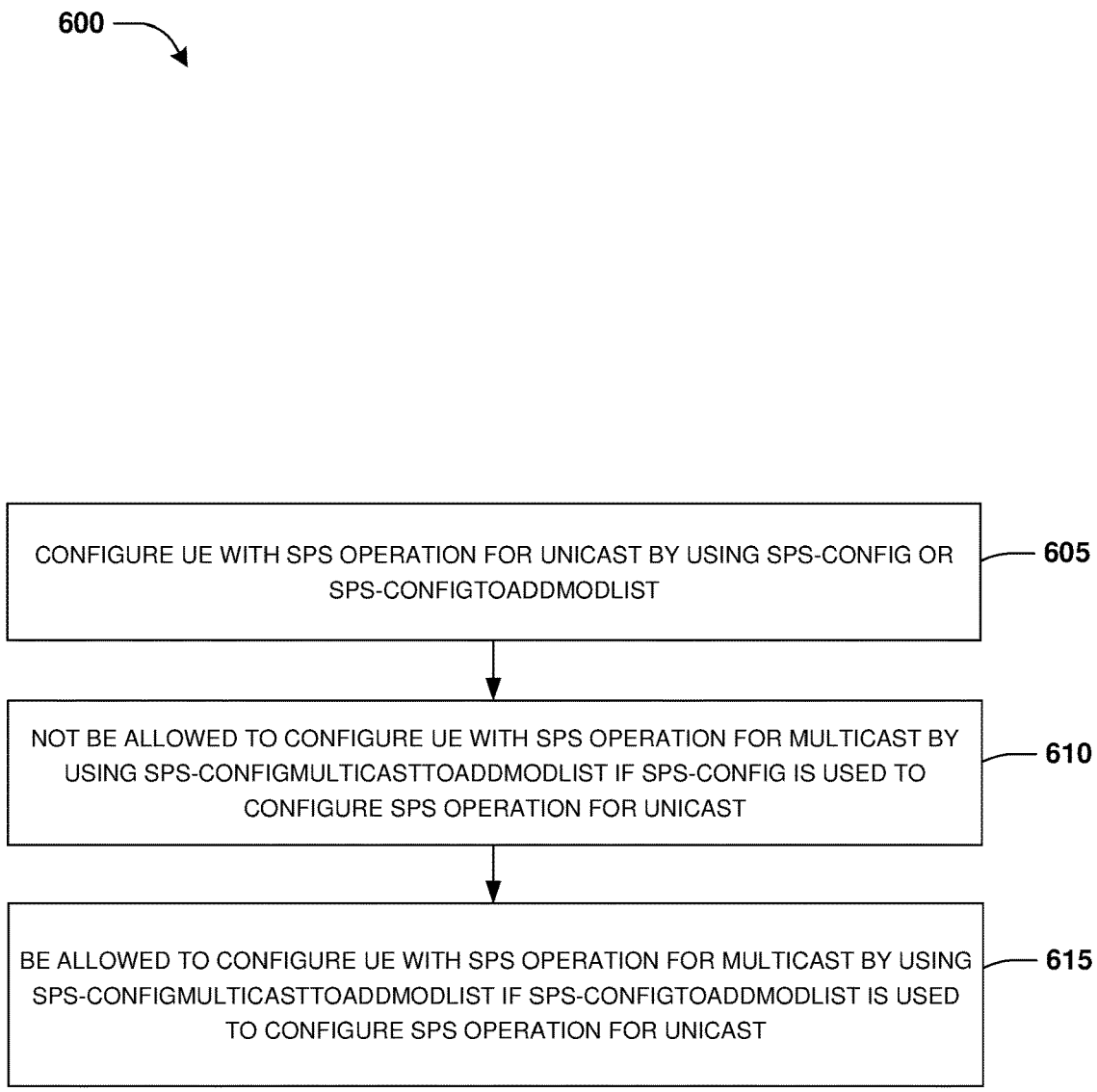
FIG. 6 is a flow chart according to one exemplary embodiment.

FIG. 6 is a flow chart 600 according to one exemplary embodiment from the perspective of a base station operating with SPS for unicast and multicast. In step 605, the base station configures a UE with SPS operation for unicast by using sps-Config or sps-ConfigToAddModList. In step 610, the base station is not allowed to configure the UE with SPS operation for multicast by using sps-ConfigMulticastToAddModList if sps-Config is used to configure SPS operation for unicast. In step 615, the base station is allowed to configure (and/or may configure) the UE with SPS operation for multicast by using sps-ConfigMulticastToAddModList if sps-ConfigToAddModList is used to configure SPS operation for unicast.

Referring back to FIGS. 3 and 4, in one exemplary embodiment of a base station operating with SPS for unicast and multicast, the device 300 includes a program code 312 stored in the memory 310. The CPU 308 may execute program code 312 to enable the base station (i) to configure a UE with SPS operation for unicast by using sps-Config or sps-ConfigToAddModList, (ii) to not be allowed to configure the UE with SPS operation for multicast by using sps-ConfigMulticastToAddModList if sps-Config is used to configure SPS operation for unicast, and (iii) to be allowed to configure (and/or to configure) the UE with SPS operation for multicast by using sps-ConfigMulticastToAddModList if sps-ConfigToAddModList is used to configure SPS operation for unicast. Furthermore, the CPU 308 can execute the program code 312 to perform one, some and/or all of the above-described actions and steps and/or others described herein.

Figure 7:
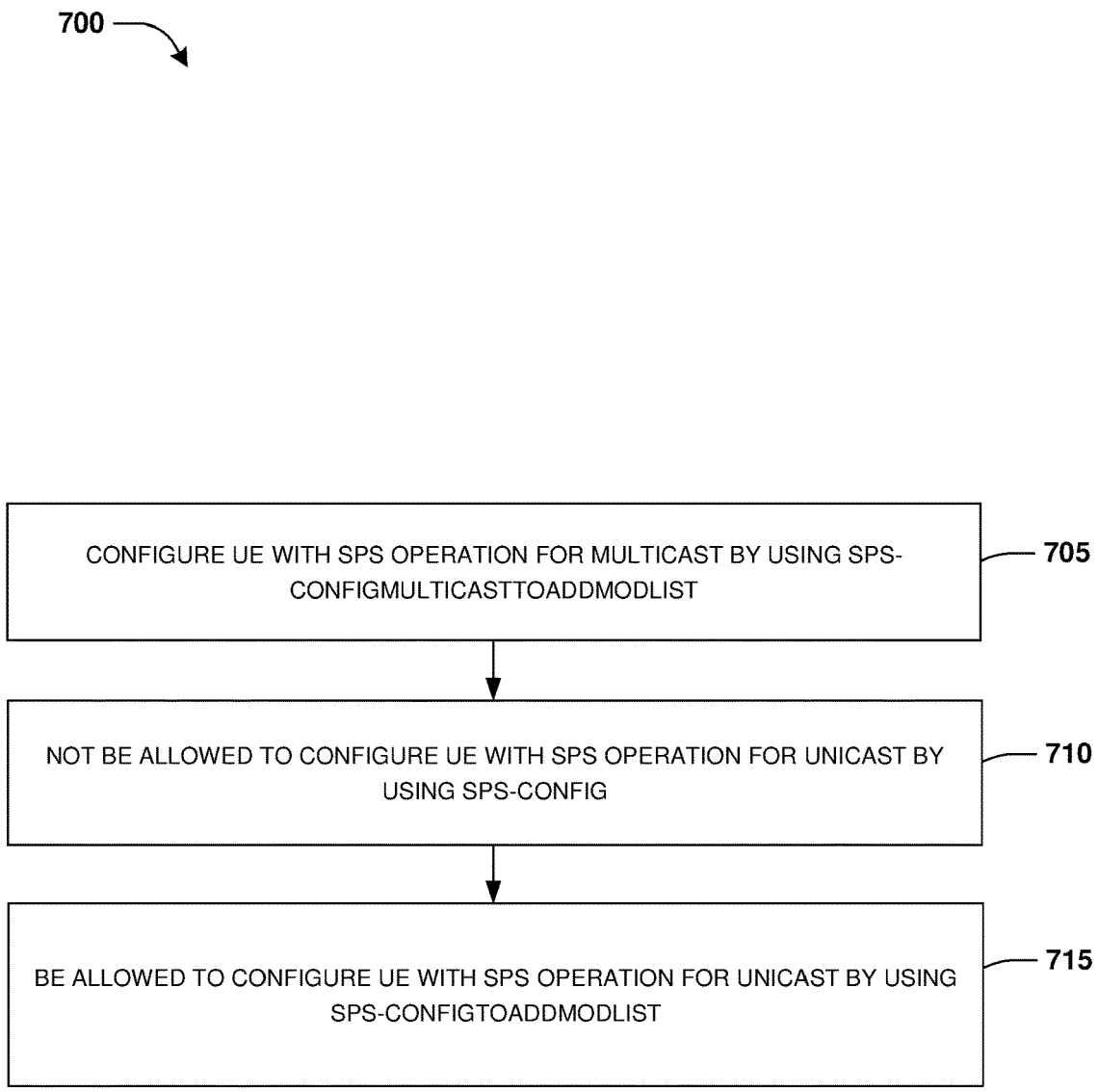
FIG. 7 is a flow chart according to one exemplary embodiment.

FIG. 7 is a flow chart 700 according to one exemplary embodiment from the perspective of a base station operating with SPS for unicast and multicast. In step 705, the base station configures a UE with SPS operation for multicast by using sps-ConfigMulticastToAddModList. In step 710, the base station is not allowed to configure the UE with SPS operation for unicast by using sps-Config. For example, the base station may not be allowed to use sps-Config to configure the UE with SPS operation for unicast based upon the UE being configured with SPS operation for multicast. In step 715, the base station is allowed to configure (and/or may configure) the UE with SPS operation for unicast by using sps-ConfigToAddModList. For example, the base station may be allowed to use sps-ConfigToAddModList to configure the UE with SPS operation for unicast when the UE is configured with SPS operation for multicast.

Referring back to FIGS. 3 and 4, in one exemplary embodiment of a base station operating with SPS for unicast and multicast, the device 300 includes a program code 312 stored in the memory 310. The CPU 308 may execute program code 312 to enable the base station (i) to configure a UE with SPS operation for multicast by using sps-ConfigMulticastToAddModList, (ii) to not be allowed to configure the UE with SPS operation for unicast by using sps-Config, and (iii) to be allowed to configure the UE with SPS operation for unicast by using sps-ConfigToAddModList. Furthermore, the CPU 308 can execute the program code 312 to perform one, some and/or all of the above-described actions and steps and/or others described herein.

Figure 8:
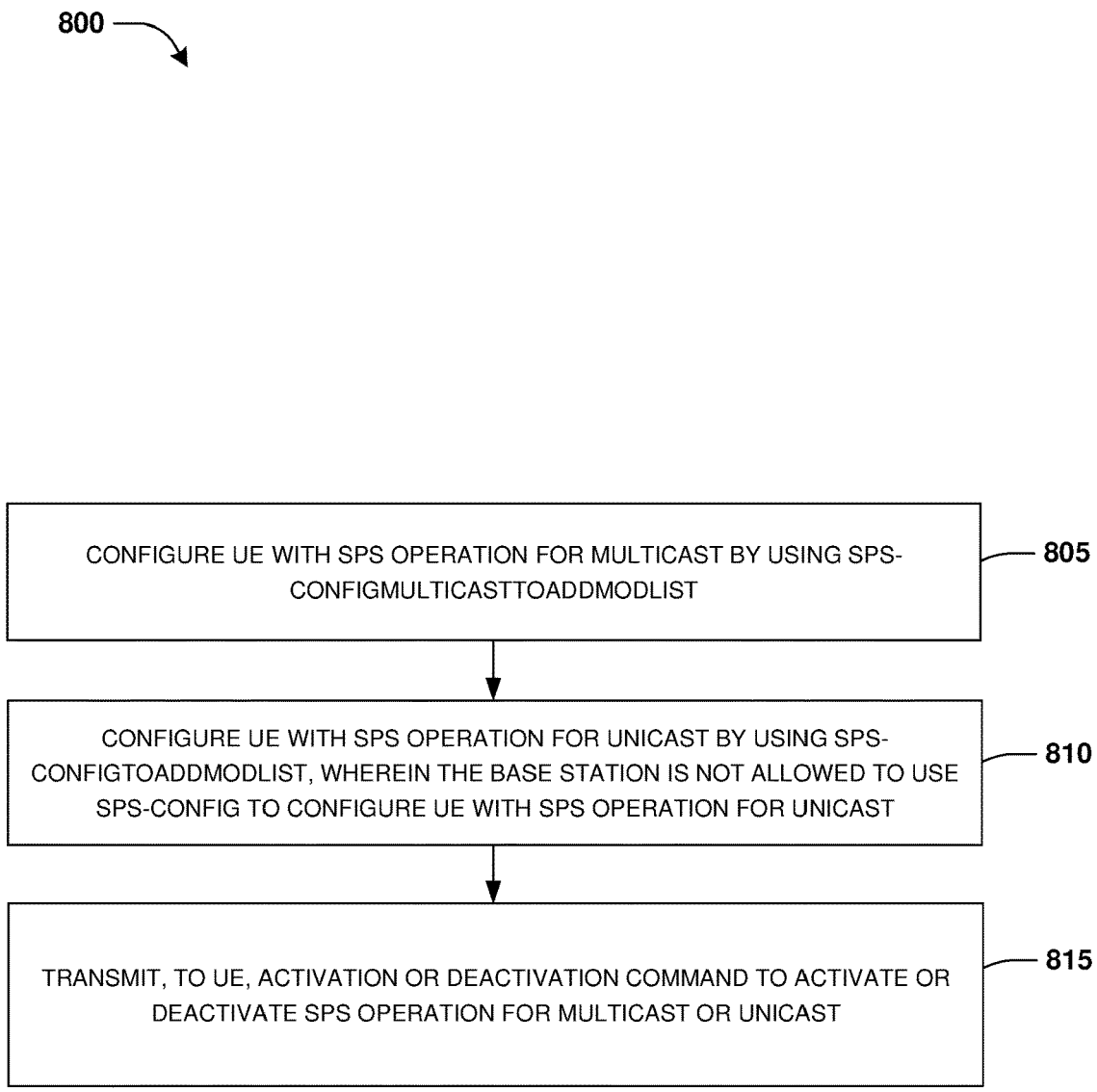
FIG. 8 is a flow chart according to one exemplary embodiment.

FIG. 8 is a flow chart 800 according to one exemplary embodiment from the perspective of a base station configuring a UE with SPS operation for unicast by either sps-Config or sps-ConfigToAddModList and for multicast by sps-ConfigMulticastToAddModList. In step 805, the base station configures the UE with SPS operation for multicast by using sps-ConfigMulticastToAddModList. In step 810, the base station configures a UE with SPS operation for unicast by using sps-ConfigToAddModList (e.g., the base station configures a UE with SPS operation for unicast by always using sps-ConfigToAddModList), wherein the base station is not allowed to use sps-Config to configure the UE with SPS operation for unicast. In step 815, the base station transmits, to the UE, an activation or deactivation command to activate or deactivate the SPS operation for multicast or unicast.

Referring back to FIGS. 3 and 4, in one exemplary embodiment of a base station configuring a UE with SPS operation for unicast by either sps-Config or sps-ConfigToAddModList and for multicast by sps-ConfigMulticastToAddModList, the device 300 includes a program code 312 stored in the memory 310. The CPU 308 may execute program code 312 to enable the base station (i) to configure the UE with SPS operation for multicast by using sps-ConfigMulticastToAddModList, (ii) to configure a UE with SPS operation for unicast by using (e.g., always using) sps-ConfigToAddModList, wherein the base station is not allowed to use sps-Config to configure the UE with SPS operation for unicast, and (iii) to transmit, to the UE, an activation or deactivation command to activate or deactivate the SPS operation for multicast or unicast. Furthermore, the CPU 308 can execute the program code 312 to perform one, some and/or all of the above-described actions and steps and/or others described herein.

With respect to FIGS. 6-8, in one embodiment, the base station can only configure the UE with SPS operation for unicast by using either sps-Config or sps-ConfigToAddModList.

Figure 9:
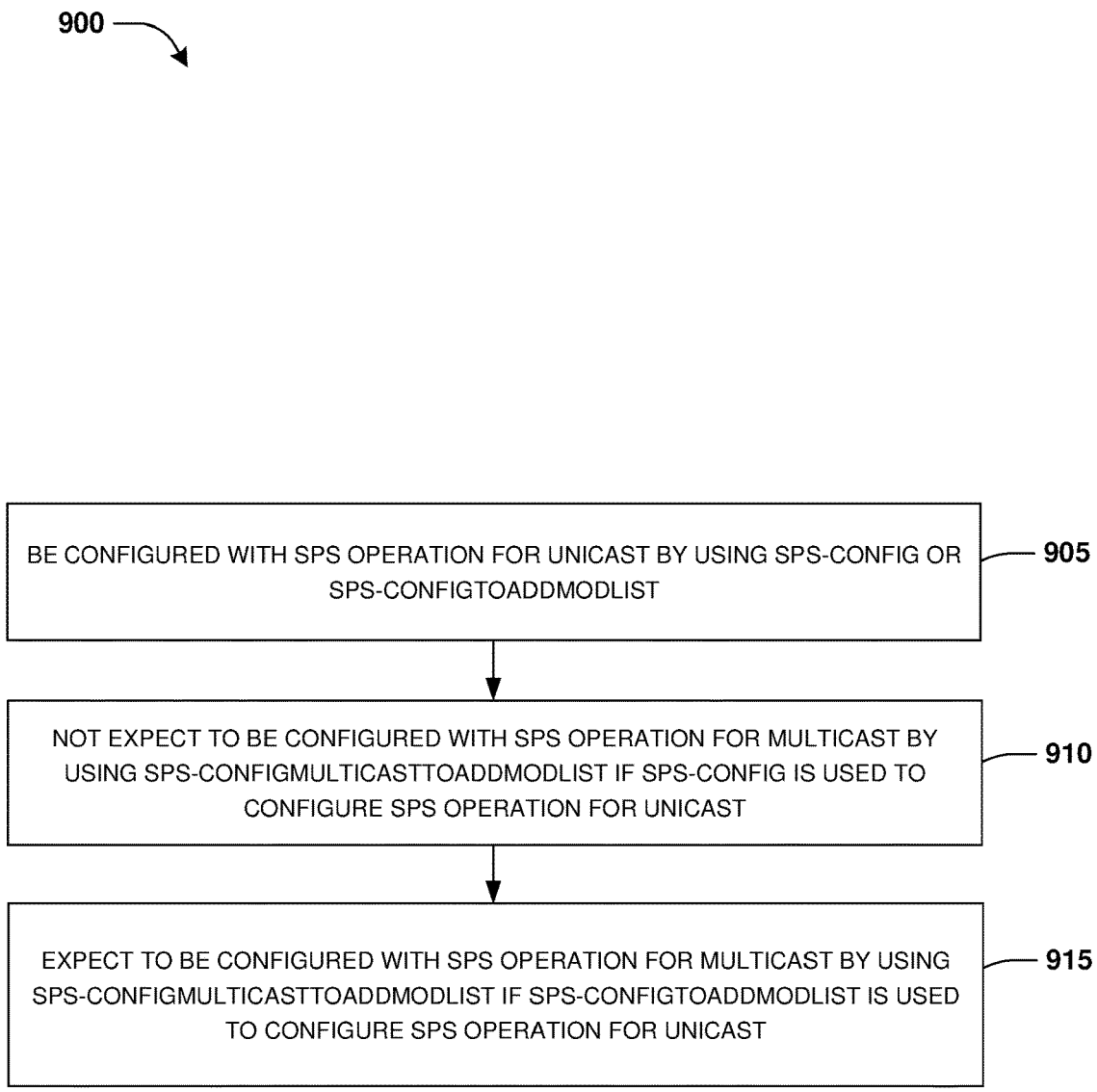
FIG. 9 is a flow chart according to one exemplary embodiment.

FIG. 9 is a flow chart 900 according to one exemplary embodiment from the perspective of a UE operating with SPS for unicast and multicast. In step 905, the UE is configured with SPS operation for unicast by using sps-Config or sps-ConfigToAddModList. In step 910, the UE does not expect to be configured with SPS operation for multicast by using sps-ConfigMulticastToAddModList if sps-Config is used to configure SPS operation for unicast. In step 915, the UE expects to be configured with (and/or may be configured with) SPS operation for multicast by using sps-ConfigMulticastToAddModList if sps-ConfigToAddModList is used to configure SPS operation for unicast.

Referring back to FIGS. 3 and 4, in one exemplary embodiment of a UE operating with SPS for unicast and multicast, the device 300 includes a program code 312 stored in the memory 310. The CPU 308 may execute program code 312 to enable the UE (i) to be configured with SPS operation for unicast by using sps-Config or sps-ConfigToAddModList, (ii) to not expect to be configured with SPS operation for multicast by using sps-ConfigMulticastToAddModList if sps-Config is used to configure SPS operation for unicast, and (iii) to expect to be configured with (and/or to be configured with) SPS operation for multicast by using sps-ConfigMulticastToAddModList if sps-ConfigToAddModList is used to configure SPS operation for unicast. Furthermore, the CPU 308 can execute the program code 312 to perform one, some and/or all of the above-described actions and steps and/or others described herein.

Figure 10:
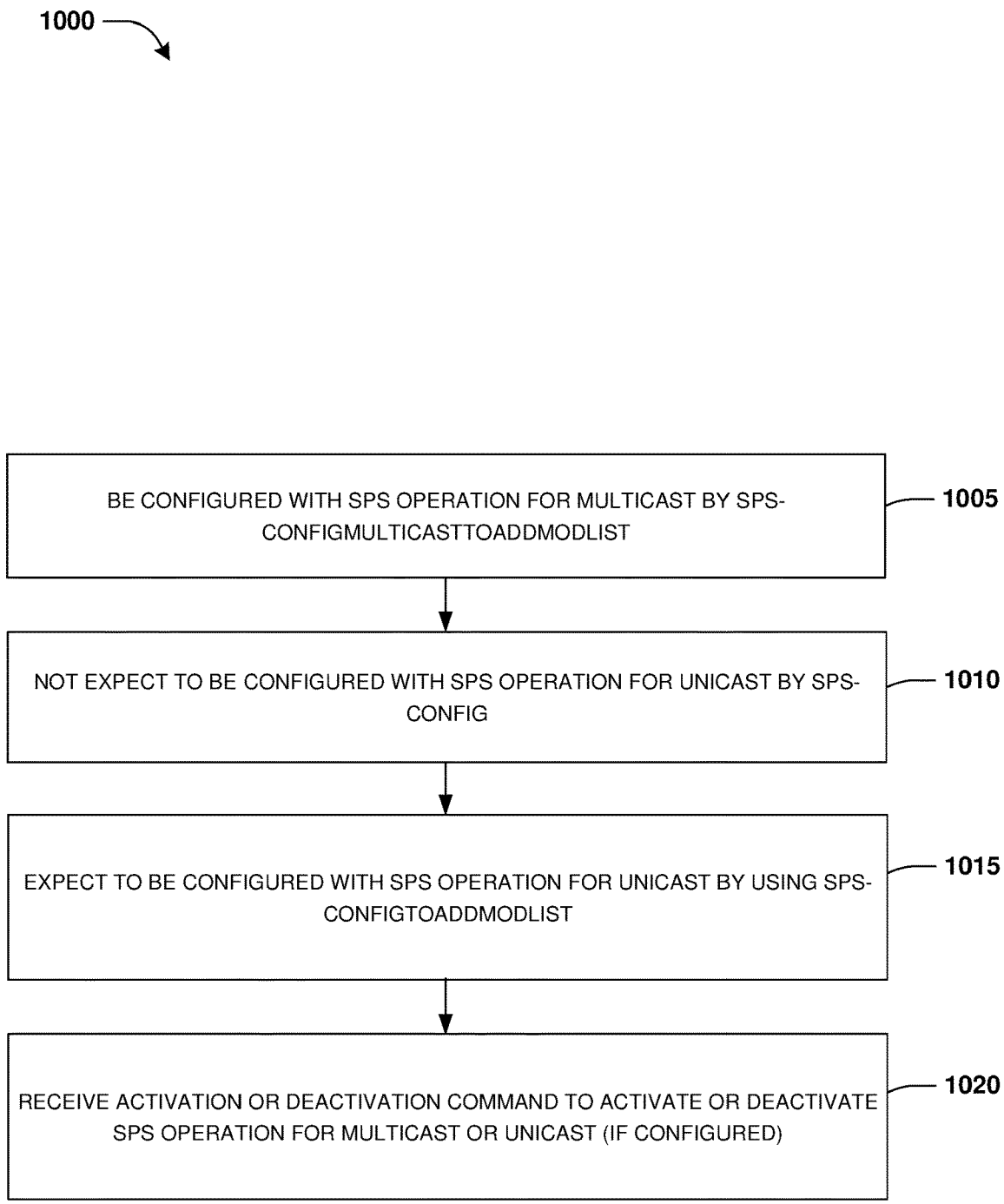
FIG. 10 is a flow chart according to one exemplary embodiment.

FIG. 10 is a flow chart 1000 according to one exemplary embodiment from the perspective of a UE operating with SPS for unicast and multicast. In step 1005, the UE is configured with SPS operation for multicast by sps-ConfigMulticastToAddModList. In step 1010, the UE does not expect to be configured with SPS operation for unicast by sps-Config. In step 1015, the UE expects to be configured (and/or is configured) with SPS operation for unicast by using sps-ConfigToAddModList. In step 1020, the UE receives an activation or deactivation command to activate or deactivate the SPS operation for multicast or unicast (if configured, for example).

Referring back to FIGS. 3 and 4, in one exemplary embodiment of a UE operating with SPS for unicast and multicast, the device 300 includes a program code 312 stored in the memory 310. The CPU 308 may execute program code 312 to enable the UE (i) to be configured with SPS operation for multicast by sps-ConfigMulticastToAddModList, (ii) to not expect to be configured with SPS operation for unicast by sps-Config, (iii) to expect to be configured (and/or to be configured) with SPS operation for unicast by using sps-ConfigToAddModList, and (iv) to receive an activation or deactivation command to activate or deactivate the SPS operation for multicast or unicast (if configured, for example). Furthermore, the CPU 308 can execute the program code 312 to perform one, some and/or all of the above-described actions and steps and/or others described herein.

With respect to FIGS. 6-10, in one embodiment, sps-Config corresponds to a UE specific SPS configuration for unicast (e.g., a single UE-specific SPS configuration for unicast).

In one embodiment, sps-ConfigToAddModList corresponds to a list of one or more SPS configurations comprising SPS index information (and/or other information) for each SPS configuration for unicast.

In one embodiment, sps-ConfigMulticastToAddModList corresponds to a list of one or more SPS configurations comprising SPS index information (and/or other information) for each SPS configuration for multicast.

Figure 11:
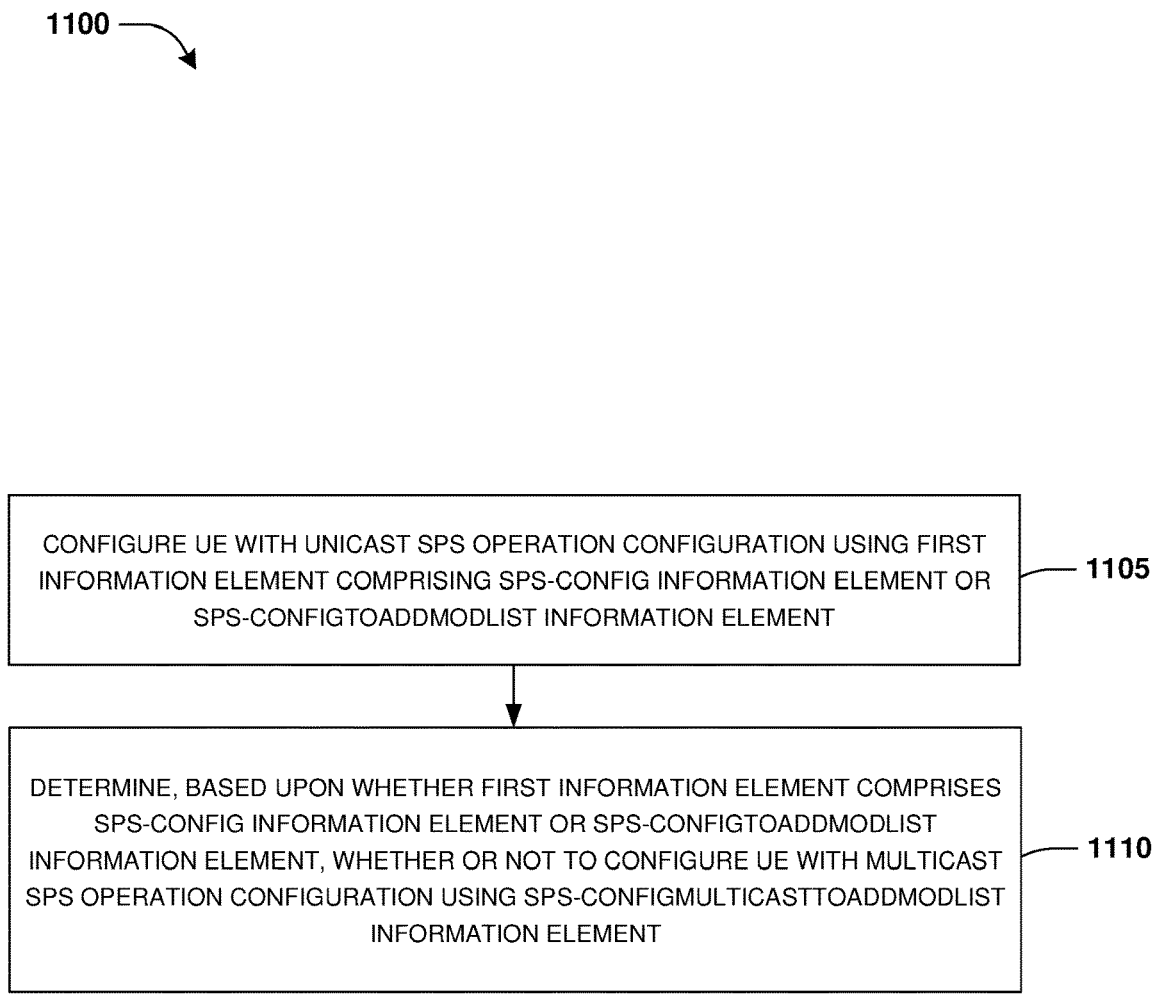
FIG. 11 is a flow chart according to one exemplary embodiment.

FIG. 11 is a flow chart 1100 according to one exemplary embodiment from the perspective of a base station operating with SPS for unicast and multicast. In step 1105, the base station configures a UE with a unicast SPS operation configuration using a first information element comprising a sps-Config information element or a sps-ConfigToAddModList information element. Configuring the UE with the unicast SPS operation configuration may comprise configuring the UE with SPS operation for unicast using the first information element (e.g., by transmitting the first information element to the UE). For example, the UE may perform SPS operation for unicast using the (configured) unicast SPS operation configuration. In step 1110, the base station determines, based upon whether the first information element comprises the sps-Config information element or the sps-ConfigToAddModList information element, whether or not to configure the UE with a multicast SPS operation configuration using a sps-ConfigMulticastToAddModList information element.

In some examples, if the base station configures the UE with the unicast SPS operation configuration using the sps-Config information element (e.g., if the first information element comprises the sps-Config information element), the unicast SPS operation configuration may be configured without a SPS ID (e.g., sps-ConfigIndex).

In some examples, if the base station configures the UE with the unicast SPS operation configuration using the sps-ConfigToAddModList information element (e.g., if the first information element comprises the sps-ConfigToAddModList information element, the unicast SPS operation configuration may be configured with a SPS ID (e.g., sps-ConfigIndex). For example, the SPS ID may be assigned to the unicast SPS operation configuration.

In one embodiment, the base station determines not to configure the UE with the multicast SPS operation configuration using the sps-ConfigMulticastToAddModList information element based upon the first information element comprising the sps-Config information element. For example, the base station may not configure the UE with the multicast SPS operation configuration using the sps-ConfigMulticastToAddModList information element based upon the first information element comprising the sps-Config information element (since the unicast SPS operation configuration is configured without a SPS ID, for example)

In one embodiment, the base station is not allowed to configure (e.g., is not configured to configure and/or is prohibited from configuring) the UE with the multicast SPS operation configuration using the sps-ConfigMulticastToAddModList information element if the first information element comprises the sps-Config information element. For example, the base station may not be not allowed to configure the UE with the multicast SPS operation configuration using the sps-ConfigMulticastToAddModList information element based upon the first information element comprising the sps-Config information element (since the unicast SPS operation configuration is configured without a SPS ID, for example)

In one embodiment, the base station determines to configure the UE with the multicast SPS operation configuration using the sps-ConfigMulticastToAddModList information element based upon the first information element comprising the sps-ConfigToAddModList information element. For example, the base station may configure the UE with the multicast SPS operation configuration using the sps-ConfigMulticastToAddModList information element based upon the first information element comprising the sps-ConfigToAddModList information element (since the unicast SPS operation configuration is configured with a SPS ID, for example)

In one embodiment, the base station is allowed to (e.g., is configured to) configure the UE with the multicast SPS operation configuration using the sps-ConfigMulticastToAddModList information element if the first information element comprises the sps-ConfigToAddModList information element. For example, the base station may be allowed to configure the UE with the multicast SPS operation configuration using the sps-ConfigMulticastToAddModList information element based upon the first information element comprising the sps-ConfigToAddModList information element (since the unicast SPS operation configuration is configured with a SPS ID, for example)

In one embodiment, the base station is only configured to (e.g., is only able to) configure the UE with a unicast SPS operation configuration using one of the sps-Config information element or the sps-ConfigToAddModList information element. For example, the base station may not be configured to (e.g., may not be able to) configure the UE with a unicast SPS operation configuration using an information element different than the one of the sps-Config information element or the sps-ConfigToAddModList information element.

In one embodiment, the sps-Config information element corresponds to a UE-specific unicast SPS operation configuration. For example, the sps-Config information element may be used by the UE (and not by other UEs, for example) to configure the unicast SPS operation configuration, which may be used to operate with SPS for unicast by the UE (and may not be used to operate with SPS for unicast by other UEs, for example).

In one embodiment, the sps-ConfigToAddModList information element corresponds to a list of one or more unicast SPS operation configurations. The list of one or more unicast SPS operation configurations comprises SPS index information (and/or other information) for each unicast SPS operation configuration of the list of one or more unicast SPS operation configurations (e.g., the SPS index information may be indicative of a SPS ID of the unicast SPS operation configuration).

In one embodiment, the sps-ConfigMulticastToAddModList information element corresponds to a list of one or more multicast SPS operation configurations. The list of one or more multicast SPS operation configurations comprises SPS index information (and/or other information) for each multicast SPS operation configuration of the list of one or more multicast SPS operation configurations (e.g., the SPS index information may be indicative of a SPS ID of the multicast SPS operation configuration).

Referring back to FIGS. 3 and 4, in one exemplary embodiment of a base station operating with SPS for unicast and multicast, the device 300 includes a program code 312 stored in the memory 310. The CPU 308 may execute program code 312 to enable the base station (i) to configure a UE with a unicast SPS operation configuration using a first information element comprising a sps-Config information element or a sps-ConfigToAddModList information element, and (ii) to determine, based upon whether the first information element comprises the sps-Config information element or the sps-ConfigToAddModList information element, whether or not to configure the UE with a multicast SPS operation configuration using a sps-ConfigMulticastToAddModList information element. Furthermore, the CPU 308 can execute the program code 312 to perform one, some and/or all of the above-described actions and steps and/or others described herein.

FIG. 12 is a flow chart 1200 according to one exemplary embodiment from the perspective of a base station operating with SPS for unicast and multicast. In step 1205, the base station configures a UE with a multicast SPS operation configuration using a sps-ConfigMulticastToAddModList information element. Configuring the UE with the multicast SPS operation configuration may comprise configuring the UE with SPS operation for multicast using the sps-ConfigMulticastToAddModList information element (e.g., by transmitting the sps-ConfigMulticastToAddModList information element to the UE). For example, the UE may perform SPS operation for multicast using the (configured) multicast SPS operation configuration. The base station is not allowed to configure (e.g., is not configured to configure and/or is prohibited from configuring) the UE with a unicast SPS operation configuration using a sps-Config information element. The base station is allowed to (e.g., is configured to) configure the UE with a unicast SPS operation configuration using a sps-ConfigToAddModList information element.

In some examples, the base station is not allowed to configure the UE with a unicast SPS operation configuration using a sps-Config information element when the UE is (already) configured with the multicast SPS operation configuration using a sps-ConfigMulticastToAddModList information element, which may avoid configuring the UE with a unicast SPS operation configuration that does not have a SPS ID when the UE is (already) configured with the multicast SPS operation configuration.

In one embodiment, the base station configures the UE with a first unicast SPS operation configuration using the sps-ConfigToAddModList information element. For example, the base station may transmit the sps-ConfigToAddModList information element to the UE, and the UE may configure the first unicast SPS operation configuration using the sps-ConfigToAddModList information element and/or may use the first unicast SPS operation configuration to perform SPS operation for unicast. The unicast SPS operation configuration may be configured with a SPS ID (e.g., sps-ConfigIndex). For example, the SPS ID may be assigned to the unicast SPS operation configuration.

In one embodiment, the base station transmits, to the UE, a command (e.g., an activation or deactivation command) to activate or deactivate the first unicast SPS operation configuration or the multicast SPS operation configuration. In some examples, the command may comprise a HARQ process number field indicating a SPS ID of the first unicast SPS operation configuration or the multicast SPS operation configuration. Based upon the command, the UE may activate or deactivate the configuration identified by the SPS ID.

In one embodiment, the base station is only configured to (e.g., is only able to) configure the UE with a unicast SPS operation configuration using a sps-Config information element or a sps-ConfigToAddModList information element. For example, the base station may not be configured to (e.g., may not be able to) configure the UE with a unicast SPS operation configuration using an information element different than sps-Config information element and sps-ConfigToAddModList information element.

In one embodiment, the sps-Config information element corresponds to a UE-specific unicast SPS operation configuration.

In one embodiment, the sps-ConfigToAddModList information element corresponds to a list of one or more unicast SPS operation configurations, wherein the list of one or more unicast SPS operation configurations comprises SPS index information (and/or other information) for each unicast SPS operation configuration of the list of one or more unicast SPS operation configurations (e.g., the SPS index information may be indicative of a SPS ID of the unicast SPS operation configuration).

In one embodiment, the sps-ConfigMulticastToAddModList information element corresponds to a list of one or more multicast SPS operation configurations, wherein the list of one or more multicast SPS operation configurations comprises SPS index information (and/or other information) for each multicast SPS operation configuration of the list of one or more multicast SPS operation configurations (e.g., the SPS index information may be indicative of a SPS ID of the multicast SPS operation configuration).

Referring back to FIGS. 3 and 4, in one exemplary embodiment of a base station operating with SPS for unicast and multicast, the device 300 includes a program code 312 stored in the memory 310. The CPU 308 may execute program code 312 to enable the base station to configure a UE with a multicast SPS operation configuration using a sps-ConfigMulticastToAddModList information element, wherein the base station is not allowed to configure the UE with a unicast SPS operation configuration using a sps-Config information element, and the base station is allowed to configure the UE with a unicast SPS operation configuration using a sps-ConfigToAddModList information element. Furthermore, the CPU 308 can execute the program code 312 to perform one, some and/or all of the above-described actions and steps and/or others described herein.

Figure 13:
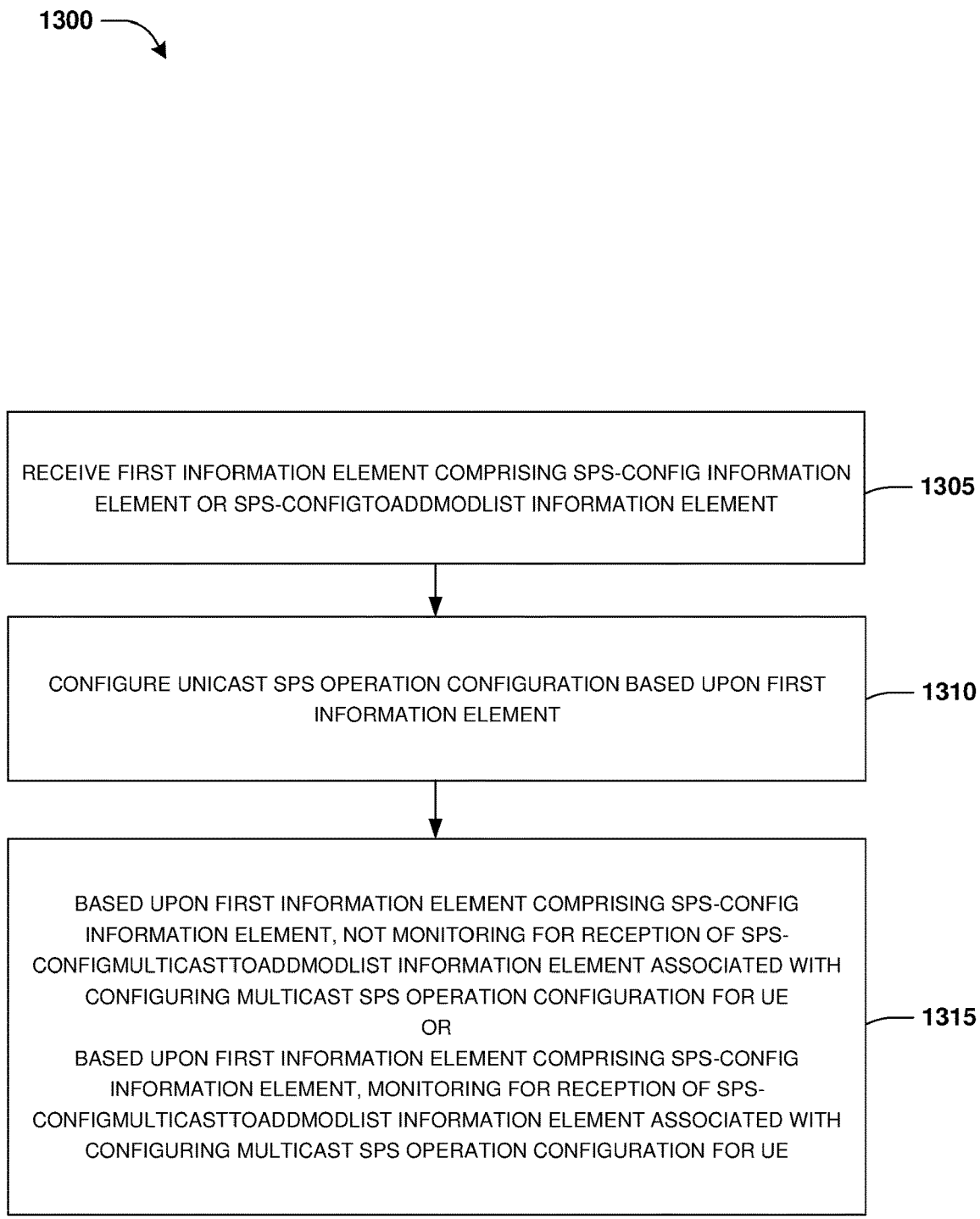
FIG. 13 is a flow chart according to one exemplary embodiment.

FIG. 13 is a flow chart 1300 according to one exemplary embodiment from the perspective of a UE operating with SPS for unicast and multicast. In step 1305, the UE receives a first information element comprising a sps-Config information element or a sps-ConfigToAddModList information element. In step 1310, the UE configures a unicast SPS operation configuration based upon the first information element. For example, the UE may perform SPS operation for unicast using the (configured) unicast SPS operation configuration. In step 1315, based upon the first information comprising the sps-Config information element, the UE does not monitor for reception of a sps-ConfigMulticastToAddModList information element associated with configuring a multicast SPS operation configuration for the UE. For example, if the first information element comprises the sps-Config information element, the UE may not expect to be configured with a multicast SPS operation configuration using a sps-ConfigMulticastToAddModList information element. Alternatively and/or additionally, based upon the first information element comprising the sps-ConfigToAddModList information element, the UE monitors (e.g., monitors a channel, such as a DL channel) for reception of a sps-ConfigMulticastToAddModList information element associated with configuring a multicast SPS operation configuration for the UE. For example, if the first information element comprises the sps-ConfigToAddModList information element, the UE may expect to be configured with a multicast SPS operation configuration using a sps-ConfigMulticastToAddModList information element.

In some examples, the UE may not monitor for reception of a sps-ConfigMulticastToAddModList information element associated with configuring a multicast SPS operation configuration for the UE (and/or the UE may not expect to be configured with a multicast SPS operation configuration using a sps-ConfigMulticastToAddModList information element) when the UE is configured with a unicast SPS operation configuration configured using a sps-Config information element (since the unicast SPS operation configuration configured using the sps-Config information element may not have a SPS ID, for example).

In one embodiment, the first information element comprises the sps-ConfigToAddModList information element. During the monitoring for reception of a sps-ConfigMulticastToAddModList information element, the UE receives a sps-ConfigMulticastToAddModList information element. The UE configures a multicast SPS operation configuration based upon the received sps-ConfigMulticastToAddModList information element. The UE may use the multicast SPS operation configuration to perform SPS operation for multicast.

In one embodiment, the sps-Config information element corresponds to a UE-specific unicast SPS operation configuration, the sps-ConfigToAddModList information element corresponds to a list of one or more unicast SPS operation configurations.

In one embodiment, the list of one or more unicast SPS operation configurations comprises SPS index information (and/or other information) for each unicast SPS operation configuration of the list of one or more unicast SPS operation configurations (e.g., the SPS index information may be indicative of a SPS ID of the unicast SPS operation configuration).

In one embodiment, the received sps-ConfigMulticastToAddModList information element corresponds to a list of one or more multicast SPS operation configurations, wherein the list of one or more multicast SPS operation configurations comprises SPS index information (and/or other information) for each multicast SPS operation configuration of the list of one or more multicast SPS operation configurations (e.g., the SPS index information may be indicative of a SPS ID of the multicast SPS operation configuration).

Referring back to FIGS. 3 and 4, in one exemplary embodiment of a UE operating with SPS for unicast and multicast, the device 300 includes a program code 312 stored in the memory 310. The CPU 308 may execute program code 312 to enable the UE (i) to receive a first information element comprising a sps-Config information element or a sps-ConfigToAddModList information element, (ii) to configure a unicast SPS operation configuration based upon the first information element, and (iii) to (A) not monitor for reception of a sps-ConfigMulticastToAddModList information element associated with configuring a multicast SPS operation configuration for the UE based upon the first information element comprising the sps-Config information element, or (B) monitor for reception of a sps-ConfigMulticastToAddModList information element associated with configuring a multicast SPS operation configuration for the UE based upon the first information element comprising the sps-ConfigToAddModList information element. Furthermore, the CPU 308 can execute the program code 312 to perform one, some and/or all of the above-described actions and steps and/or others described herein.

Figure 14:
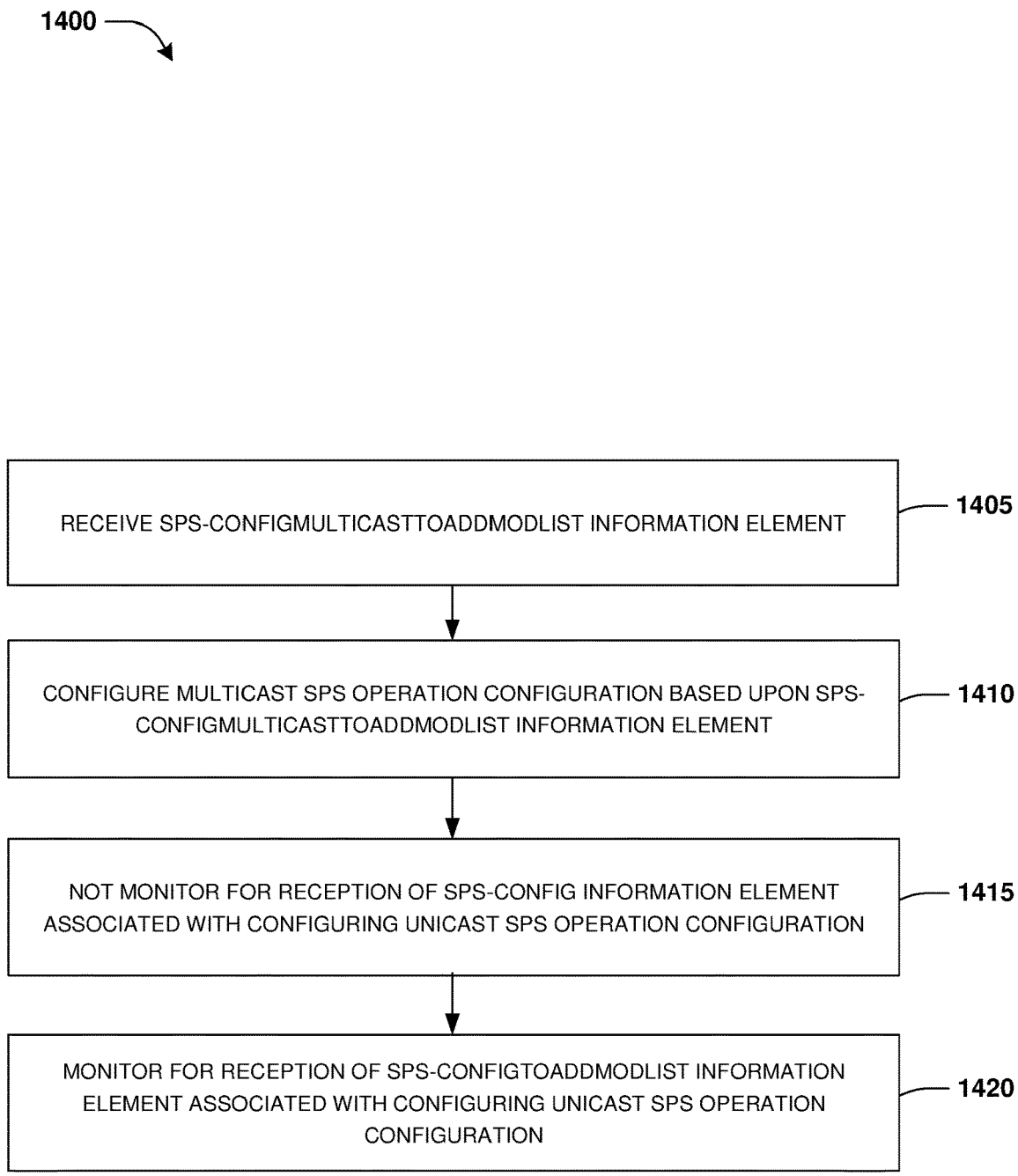
FIG. 14 is a flow chart according to one exemplary embodiment.

FIG. 14 is a flow chart 1400 according to one exemplary embodiment from the perspective of a UE operating with SPS for unicast and multicast. In step 1405, the UE receives a sps-ConfigMulticastToAddModList information element. In step 1410, the UE configures a multicast SPS operation configuration based upon the sps-ConfigMulticastToAddModList information element. In step 1415, the UE does not monitor for reception of a sps-Config information element associated with configuring a unicast SPS operation configuration (e.g., a unicast SPS operation configuration that does not have a SPS ID). For example, the UE may not expect to be configured with a unicast SPS operation configuration using a sps-Config information element. In step 1420, the UE monitors (e.g., monitors a channel, such as a DL channel) for reception of a sps-ConfigToAddModList information element associated with configuring a unicast SPS operation configuration (e.g., a unicast SPS operation configuration that has a SPS ID). For example, the UE may expect to be configured with a unicast SPS operation configuration using a sps-ConfigToAddModList information element.

In some examples, the UE does not monitor for reception of a sps-Config information element associated with configuring a unicast SPS operation configuration (and/or the UE may not expect to be configured with a unicast SPS operation configuration using a sps-Config information element) when the UE is (already) configured with the multicast SPS operation configuration using the sps-ConfigMulticastToAddModList information element, which may avoid the UE being configured with a unicast SPS operation configuration that does not have a SPS ID when the UE is (already) configured with the multicast SPS operation configuration.

In one embodiment, the UE receives a sps-ConfigToAddModList information element. In some examples, the UE receives the sps-ConfigToAddModList information element while monitoring for the sps-ConfigToAddModList information element. The UE configures a unicast SPS operation configuration based upon the received sps-ConfigToAddModList information element. The UE may use the unicast SPS operation configuration to perform SPS operation for unicast.

In one embodiment, the UE receives a command (e.g., an activation or deactivation command) to activate or deactivate the unicast SPS operation configuration configured based upon the received sps-ConfigToAddModList information element. In some examples, based upon the command, the UE activates or deactivates the unicast SPS operation configuration configured based upon the received sps-ConfigToAddModList information element. In some examples, the command may comprise a HARQ process number field indicating a SPS ID of the unicast SPS operation configuration configured based upon the received sps-ConfigToAddModList information element. Based upon the command, the UE may activate or deactivate the unicast SPS operation configuration identified by the SPS ID.

In one embodiment, the UE receives a command (e.g., an activation or deactivation command) to activate or deactivate the multicast SPS operation configuration configured based upon the received sps-ConfigMulticastToAddModList information element. In one embodiment, based upon the command, the UE activates or deactivates the multicast SPS operation configuration. In some examples, the command may comprise a HARQ process number field indicating a SPS ID of the multicast SPS operation configuration. Based upon the command, the UE may activate or deactivate the multicast SPS operation configuration identified by the SPS ID.

In one embodiment, the sps-Config information element corresponds to a UE-specific unicast SPS operation configuration, or the sps-ConfigMulticastToAddModList information element corresponds to a list of one or more multicast SPS operation configurations.

In one embodiment, the list of one or more multicast SPS operation configurations comprises SPS index information (and/or other information) for each multicast SPS operation configuration of the list of one or more multicast SPS operation configurations (e.g., the SPS index information may be indicative of a SPS ID of the multicast SPS operation configuration).

In one embodiment, the received sps-ConfigToAddModList information element corresponds to a list of one or more unicast SPS operation configurations, wherein the list of one or more unicast SPS operation configurations comprises SPS index information (and/or other information) for each unicast SPS operation configuration of the list of one or more unicast SPS operation configurations (e.g., the SPS index information may be indicative of a SPS ID of the unicast SPS operation configuration).

Referring back to FIGS. 3 and 4, in one exemplary embodiment of a UE operating with SPS for unicast and multicast, the device 300 includes a program code 312 stored in the memory 310. The CPU 308 may execute program code 312 to enable the UE (i) to receive a sps-ConfigMulticastToAddModList information element, (ii) to configure a multicast SPS operation configuration based upon the sps-ConfigMulticastToAddModList information element, (iii) to not monitor for reception of a sps-Config information element associated with configuring a unicast SPS operation configuration, and (iv) to monitor for reception of a sps-ConfigToAddModList information element associated with configuring a unicast SPS operation configuration. Furthermore, the CPU 308 can execute the program code 312 to perform one, some and/or all of the above-described actions and steps and/or others described herein.

A communication device (e.g., a UE, a network node, such as a base station and/or a gNB, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 6-14. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 6-14, and/or one, some and/or all of the above-described actions and steps and/or others described herein.

It may be appreciated that applying one or more of the techniques presented herein may result in one or more benefits including, but not limited to, increased efficiency of communication between devices (e.g., one or more UEs and/or a base station), such as due, at least in part, to enabling and/or improving validation of SPS deactivation for unicast and/or multicast.

Various aspects of the disclosure have been described above. It should be apparent that the teachings herein may be embodied in a wide variety of forms and that any specific structure, function, or both being disclosed herein is merely representative. Based upon the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based upon pulse repetition frequencies. In some aspects concurrent channels may be established based upon pulse position or offsets. In some aspects concurrent channels may be established based upon time hopping sequences. In some aspects concurrent channels may be established based upon pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a base station operating with Semi-Persistent Scheduling (SPS) for unicast and multicast, the method comprising:

configuring a User Equipment (UE) with a unicast SPS operation configuration using a first information element comprising a sps-Config information element or a sps-ConfigToAddModList information element; and determining, based upon whether the first information element comprises the sps-Config information element or the sps-ConfigToAddModList information element, whether or not to configure the UE with a multicast SPS operation configuration using a sps-ConfigMulticastToAddModList information element, wherein at least one of:
  the sps-Config information element corresponds to a UE-specific unicast SPS operation configuration;
  the sps-ConfigToAddModList information element corresponds to a list of one or more unicast SPS operation configurations, wherein the list of one or more unicast SPS operation configurations comprises SPS index information for each unicast SPS operation configuration of the list of one or more unicast SPS operation configurations; or
  the sps-ConfigMulticastToAddModList information element corresponds to a list of one or more multicast SPS operation configurations, wherein the list of one or more multicast SPS operation configurations comprises SPS index information for each multicast SPS operation configuration of the list of one or more multicast SPS operation configurations.

2. The method of claim 1, wherein:
the base station determines not to configure the UE with the multicast SPS operation configuration using the sps-ConfigMulticastToAddModList information element based upon the first information element comprising the sps-Config information element.

3. The method of claim 1, wherein:
the base station is not allowed to configure the UE with the multicast SPS operation configuration using the sps-ConfigMulticastToAddModList information element if the first information element comprises the sps-Config information element.

4. The method of claim 1, wherein:
the base station determines to configure the UE with the multicast SPS operation configuration using the sps-ConfigMulticastToAddModList information element based upon the first information element comprising the sps-ConfigToAddModList information element.

5. The method of claim 1, wherein:
the base station is allowed to configure the UE with the multicast SPS operation configuration using the sps-ConfigMulticastToAddModList information element if the first information element comprises the sps-ConfigToAddModList information element.

6. The method of claim 1, wherein:
the base station is only configured to configure the UE with a unicast SPS operation configuration using one of:
  the sps-Config information element; or
  the sps-ConfigToAddModList information element.

7. A method of a base station operating with Semi-Persistent Scheduling (SPS) for unicast and multicast, the method comprising:
configuring a User Equipment (UE) with a multicast SPS operation configuration using a sps-ConfigMulticastToAddModList information element, wherein:
  the base station is not allowed to configure the UE with a unicast SPS operation configuration using a sps-Config information element; and
  the base station is allowed to configure the UE with a unicast SPS operation configuration using a sps-ConfigToAddModList information element,
wherein at least one of:
  the sps-Config information element corresponds to a UE-specific unicast SPS operation configuration;
  the sps-ConfigToAddModList information element corresponds to a list of one or more unicast SPS operation configurations, wherein the list of one or more unicast SPS operation configurations comprises SPS index information for each unicast SPS operation configuration of the list of one or more unicast SPS operation configurations; or
  the sps-ConfigMulticastToAddModList information element corresponds to a list of one or more multicast SPS operation configurations, wherein the list of one or more multicast SPS operation configurations comprises SPS index information for each multicast SPS operation configuration of the list of one or more multicast SPS operation configurations.

8. The method of claim 7, comprising:
configuring the UE with a first unicast SPS operation configuration using the sps-ConfigToAddModList information element.

9. The method of claim 8, comprising:
transmitting, to the UE, a command to activate or deactivate the first unicast SPS operation configuration or the multicast SPS operation configuration.

10. The method of claim 7, wherein:
the base station is only configured to configure the UE with a unicast SPS operation configuration using only a sps-Config information element or a sps-ConfigToAddModList information element.

11. A method of a User Equipment (UE) operating with Semi-Persistent Scheduling (SPS) for unicast and multicast, the method comprising:
receiving a sps-ConfigMulticastToAddModList information element;
configuring a multicast SPS operation configuration based upon the sps-ConfigMulticastToAddModList information element;
not monitoring for reception of a sps-Config information element associated with configuring a unicast SPS operation configuration; and
monitoring for reception of a sps-ConfigToAddModList information element associated with configuring a unicast SPS operation configuration,
wherein:
  the sps-ConfigMulticastToAddModList information element corresponds to a list of one or more multicast SPS operation configurations, wherein the list of one or more multicast SPS operation configurations comprises SPS index information for each multicast SPS operation configuration of the list of one or more multicast SPS operation configurations; or
  the received sps-ConfigToAddModList information element corresponds to a list of one or more unicast SPS operation configurations, wherein the list of one or more unicast SPS operation configurations comprises SPS index information for each unicast SPS operation configuration of the list of one or more unicast SPS operation configurations.

12. The method of claim 11, comprising:
receiving the sps-ConfigToAddModList information element; and
configuring the unicast SPS operation configuration based upon the received sps-ConfigToAddModList information element.

13. The method of claim 12, comprising:
receiving a command to activate or deactivate the unicast SPS operation configuration configured based upon the received sps-ConfigToAddModList information element.

14. The method of claim 12, comprising:
receiving a command to activate or deactivate the multicast SPS operation configuration configured based upon the sps-ConfigMulticastToAddModList information element.

15. The method of claim 11, wherein:
the sps-Config information element corresponds to a UE-specific unicast SPS operation configuration.

* * * * *